United States Patent
Park et al.

(10) Patent No.: US 7,259,756 B2
(45) Date of Patent: Aug. 21, 2007

(54) METHOD AND APPARATUS FOR SELECTING INFORMATION IN MULTI-DIMENSIONAL SPACE

(75) Inventors: Tae-Sik Park, Suwon-si (KR); Sang-Goog Lee, Anyang-si (KR); Kwang-Woon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 384 days.

(21) Appl. No.: 10/484,505

(22) PCT Filed: Jul. 22, 2002

(86) PCT No.: PCT/KR02/01369

§ 371 (c)(1),
(2), (4) Date: Jan. 22, 2004

(87) PCT Pub. No.: WO03/010652

PCT Pub. Date: Feb. 6, 2003

(65) Prior Publication Data

US 2004/0169636 A1    Sep. 2, 2004

(30) Foreign Application Priority Data

Jul. 24, 2001   (KR) ................ 2001-44588

(51) Int. Cl.
*G09G 5/00* (2006.01)
(52) U.S. Cl. .............. 345/204; 345/156; 345/157; 345/158
(58) Field of Classification Search ............. 345/204, 345/156, 157, 158
See application file for complete search history.

(56) References Cited

U.S. PATENT DOCUMENTS

| | | | |
|---|---|---|---|
| 5,146,566 A | 9/1992 | Hollis, Jr. | |
| 5,982,352 A | 11/1999 | Pryor | |
| 6,346,929 B1 * | 2/2002 | Fukushima et al. | ............ 345/8 |
| 6,529,130 B2 * | 3/2003 | Pakhomov | ................ 340/566 |

FOREIGN PATENT DOCUMENTS

| | | |
|---|---|---|
| KR | 10-0221335 B1 | 6/1999 |
| KR | 2000-0063192 A | 11/2000 |

* cited by examiner

*Primary Examiner*—Richard Hjerpe
*Assistant Examiner*—Leonid Shapiro
(74) *Attorney, Agent, or Firm*—Sughrue Mion, PLLC

(57) ABSTRACT

Method and apparatus for selecting information in a multi-dimensional space are provided. The method includes the steps of sensing the motion of a user intending to select information, and determining whether the sensed motion is an effective motion intended for information selection and returning to the sensing step if it is determined that the motion is not the effective one. Accordingly, difficulty in setting a predetermined threshold to a single value can be overcome. In addition, even a very slight motion can be accurately detected without being influenced by gravity and offsets. Moreover, it can be accurately determined whether a user's two- or three-dimensional motion is an effective motion for selecting information and which motion unit among at least two motion units has generated the effective motion, so that a high correct recognition rate for information and high reliability can be achieved, and a user is allowed to easily select information.

54 Claims, 18 Drawing Sheets

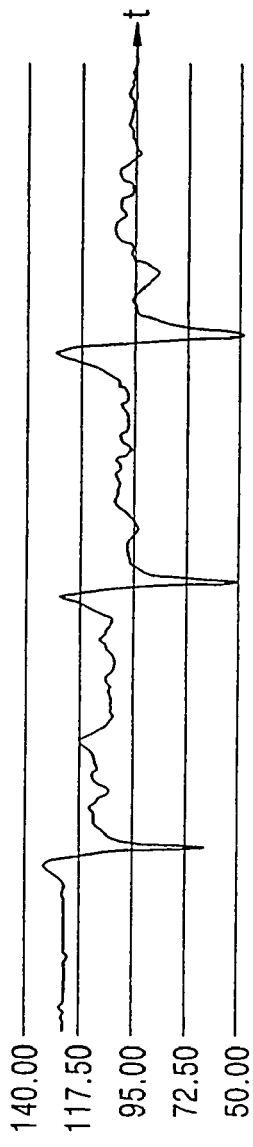
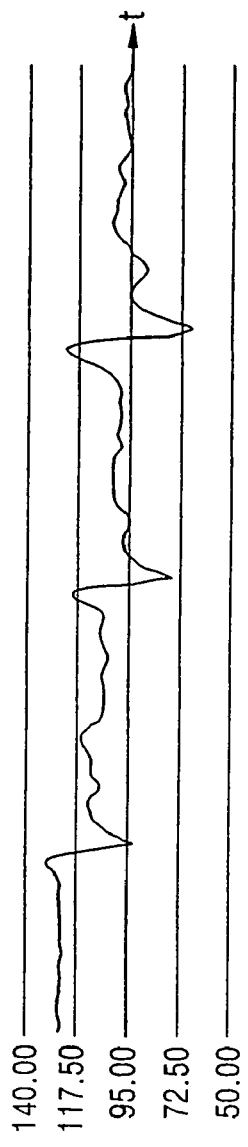
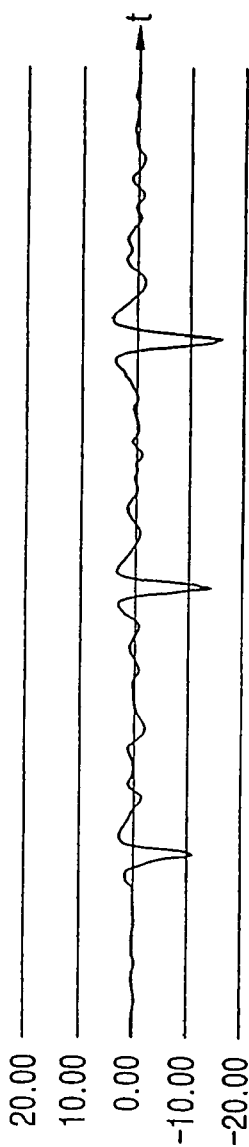
FIG. 6A
FIG. 6B
FIG. 6C

METHOD AND APPARATUS FOR SELECTING INFORMATION IN MULTI-DIMENSIONAL SPACE

TECHNICAL FIELD

The present invention relates to an apparatus for sensing a motion for selecting information in a two- or three-dimensional space, and more particularly, to an information selection method and apparatus for determining whether a sensed motion is effective in a multi-dimensional space.

BACKGROUND ART

Representative apparatuses for sensing a user's motion for pointing at or inputting information in a two- or three-dimensional space are handheld space-type input apparatuses, such as personal computers (PCs), personal digital assistances (PDAs), and cellular phones; wireless portable pointing apparatuses, wireless portable keyboards; hand motion and gesture recognizing apparatuses; virtual musical playing apparatuses; computer game machines; virtual environment exercise and training apparatuses; virtual reality data gloves; mechanical impact and shake tracking and monitoring apparatuses; and robot motion information acquiring apparatuses.

Usually, in order to determine whether information generated by a user's motion using the above apparatuses is effective, conventionally, a mechanical switch or a pressure sensor is used. In other words, according to a conventional method, when a switch or sensor is pushed or touched on a plane, an on/off signal is generated, and effective information is identified according to the on/off signal. Conventionally, whether a user's motion for selecting information is an effective one can be determined by contact on a plane, but whether a user's motion for selecting information in a three-dimensional space is an effective one cannot be determined via the same method.

DISCLOSURE OF THE INVENTION

To achieve the above-described problem, it is a first object of the present invention to provide an information selection method through which information selected by a user can be exactly recognized from the user's motion for selecting information in a multi-dimensional space.

It is a second object of the present invention to provide an information selection apparatus for performing the above information selection method in a multi-dimensional space.

To achieve the first object of the invention, there is provided a method of selecting information in a multi-dimensional space. The method includes the steps of (a) sensing the motion of a user for information selection; and (b) determining whether the sensed motion is an effective motion of the intended information selection and returning to step (a) if it is determined that the motion is not the effective motion.

To achieve the second object of the invention, there is provided an apparatus for selecting information in a multi-dimensional space. The apparatus includes at least one motion unit moved by a user intending to select information; at least one sensing unit for sensing the motion of the motion unit and outputting the result of sensing; and at least one effective signal detection unit for checking whether the motion of the motion unit is an effective motion intending to select the information based on the result of sensing and outputting the result of checking as an effective signal.

BRIEF DESCRIPTION OF THE DRAWINGS

The above objects and advantages of the present invention will become more apparent by describing in detail preferred embodiments thereof with reference to the attached drawings in which:

FIGS. 6A through 6C are waveform diagrams of signals input to or output from the respective parts of the feature amount detector of FIG. 5;

BEST MODE FOR CARRYING OUT THE INVENTION

Hereinafter, a method of selecting information in a multi-dimensional space according to the present invention and the structure and operations of an information selection apparatus for performing the above method according to the present invention will be described with reference to the attached drawings.

Figure 1:
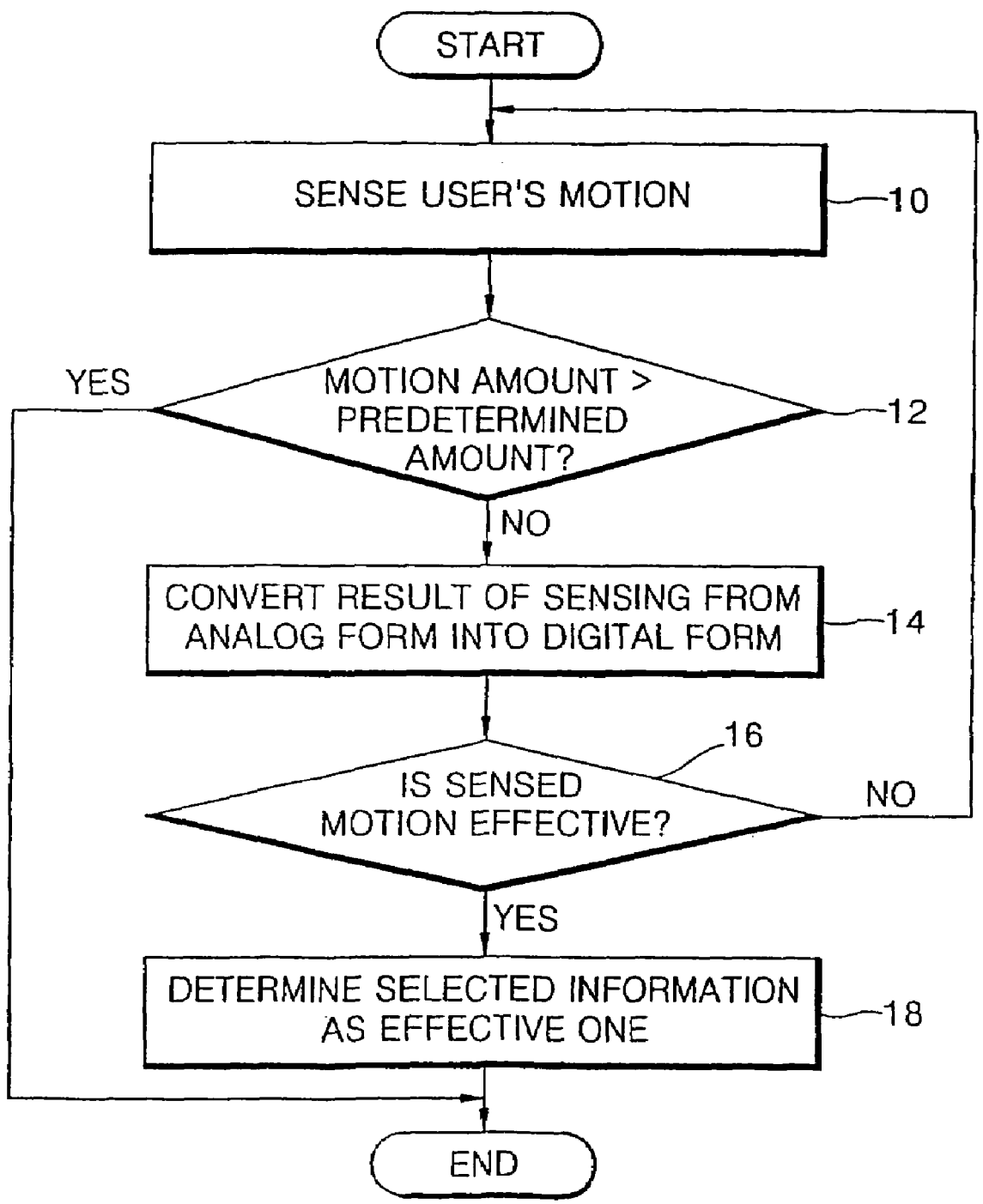
FIG. 1 is a flowchart of a method of selecting information in a multi-dimensional space according to the present invention.

FIG. 1 is a flowchart of a method of selecting information in a multi-dimensional space according to the present invention. The method includes identifying effective information depending on whether a user's motion is effective, in steps 10 through 18.

Figure 2:
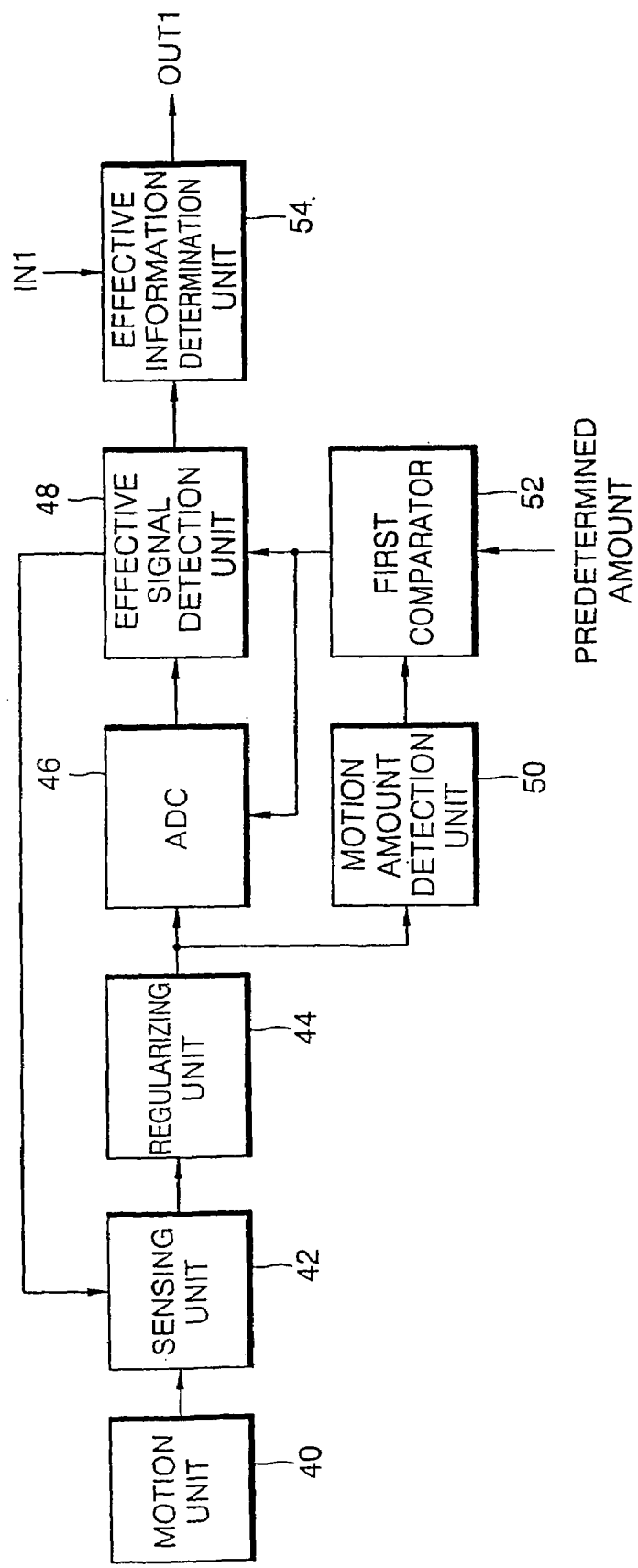
FIG. 2 is a block diagram of an information selection apparatus for performing the method of FIG. 1 according to the present invention.

FIG. 2 is a block diagram of an information selection apparatus for performing the method of FIG. 1 according to the present invention. The information selection apparatus includes a motion unit 40, a sensing unit 42, a regularizing unit 44, an analog-to-digital converter (ADC) 46, an effective signal detection unit 48, a motion amount detection unit 50, a first comparator 52, and an effective information determination unit 54.

At least one motion unit 40 shown in FIG. 2 is moved by a user. When the user desires to select information, that is, when the user points at information or determines input of information, he/she moves the motion unit 40 in a two- or three-dimensional space. Generally, the user performs a clicking motion when determining the input of pointed information. To sense such a clicking motion, for example, the motion unit 40 may be attached to each finger performing the clicking motion.

In one embodiment of the present invention, the motion unit 40 can be attached to a predetermined body part, for example, a hand, finger, foot, head, arm, or leg, of a user. The motion unit 40 may be a member (not shown) of a glove type which is directly installed on the hand or may be a manipulation member (not shown) which can be manipulated by the user without being directly attached to the user's predetermined body part. For example, the manipulation member as the motion unit 40 can be realized in the form of a glove-puppet.

To perform a method of selecting information according to the present invention, at least one sensing unit 42 senses the motion of the motion unit 40 moved by a user desiring to select information and outputs the result of sensing the motion in step 10. The sensing unit 42 can visually sense the motion of the motion unit 40. For this, the sensing unit 42 visually observes the motion of the motion unit 40 through a monitor (not shown) and outputs the result of observation as the motion of the motion unit 40. In addition, the sensing unit 42 can sense the amount of motion of the motion unit 40 through the variation of acceleration, the variation of angular velocity, the variation of resistance, the variation of capacitance, the variation of a magnetic field, the direction of a magnetic field, or the variation of the number of pulses. For this, the sensing unit 42 can be realized as a Micro ElectroMechanic System (MEMS) inertial sensor for sensing the variation of acceleration and angular velocity, a variable resistance sensor for sensing the variation of resistance, a variable capacity sensor for sensing the variation of capacitance, a magnetic sensor for sensing the variation of a magnetic field or the direction of a magnetic field, or a rotary encoder type sensor for sensing the variation of the number of pulses. Here, the magnetic sensor can be realized as a giant magneto resistive (GMR) sensor. The examples of the structures and operations of these sensors are disclosed in Korean Patent Application No. 2001-41560, entitled "Information Input Apparatus and Method Using Body Angle at Joint".

The information selection apparatus of FIG. 2 can be provided with the regularizing unit 44 for the case where a plurality of motions are sensed by at least one sensing unit 42. The information selection apparatus may not be provided with the regularizing unit 44 when only one motion is sensed by the sensing unit 42. The regularizing unit 44 regularizes the result of sensing of the sensing unit 42 and outputs the result of regularization to the ADC 46 and the motion amount detection unit 50.

If the regularizing unit 44 is not provided, after step 10, it is determined whether the amount of the sensed motion exceeds a predetermined amount in step 12. If it is determined that the sensed motion amount exceeds the predetermined amount, an information selection method according to the present invention ends. However, if it is determined that the sensed motion amount does not exceed the predetermined amount, the procedure goes to step 14. To perform step 12, the information selection apparatus of FIG. 2 can be provided with the motion amount detection unit 50 and the first comparator 52. Here, if the regularizing unit 44 is not provided, the motion amount detection unit 50 detects a motion amount from the result of sensing of the sensing unit 42 and outputs the detected motion amount to the first comparator 52. In contrast, if the regularizing unit 44 is provided, the motion amount detection unit 50 detects a motion amount from the result of regularization received from the regularizing unit 44. The first comparator 52 compares the motion amount received from the motion amount detection unit 50 with a predetermined amount externally received and outputs the result of comparison to the effective signal detection unit 48. For example, when it is assumed that the motion unit 40 is attached to each finger, and that a user selects information by moving a finger, that is, by bending or clicking the finger, the motion of a finger accompanied with a large motion of a user's hand to the front, to the back, to the left, to the right, up, or down is supposed not to be the user's intentional motion for selecting information. Therefore, the result of sensing such an unintentional motion must not be used in an information selection method according to the present invention. For this, step 12 is performed. Accordingly, if it is determined that the motion amount exceeds the predetermined amount based on the result of comparison received from the first comparator 52, the effective signal detection unit 48 does not generate an effective signal. According to the present invention, step 12 can be selectively provided. Consequently, the motion amount detection unit 50 and the first comparator 52 can also be selectively provided.

If it is determined that the motion amount does not exceed the predetermined amount, when the regularizing unit 44 is not provided, the ADC 46 converts the result of sensing received from the sensing unit 42 from an analog form into a digital form in response to the result of comparison received from the first comparator 52 and outputs the result of conversion to the effective signal detection unit 48 in step 14. However, when the regularizing unit 44 is provided, the ADC 46 converts the result of regularization received from the regularizing unit 44 from an analog form into a digital form and outputs the result of conversion to the effective signal detection unit 48. According to an embodiment of the present invention, the ADC 46 converts the result of sensing from an analog form into a digital form only when it is recognized that the sensed motion amount does not exceed the predetermined amount based on the result of comparison received from the first comparator 52. However, according to another embodiment of the present invention, unlike FIG. 2, the ADC 46 can convert the result of sensing in an analog form into a digital form regardless of the result of comparison performed by the first comparator 52. In this case, the effective signal detection unit 48 receiving the result of comparison performed by the first comparator 52 determines whether the result of conversion output from the ADC 46 is used for generating an effective signal.

In addition, according to the present invention, step 14 and the ADC 46 can be selectively provided. In other words, when the result of sensing performed by the sensing unit 42 has an analog form and the effective signal detection unit 48 detects an effective signal in a digital form, the ADC 46 is provided. However, when the result of sensing performed by the sensing unit 42 has a digital form, the ADC 46 is not provided.

According to the present invention, unlike FIG. 1, step 14 can be provided between step 10 and step 12. For example, after step 10, the result of sensing is converted from an analog form into a digital form, and the procedure goes to step 12. For this, unlike FIG. 2, the ADC 46 is provided between the sensing unit 42 and the regularizing unit 44, so the result of sensing is converted from an analog form into a digital form either in response to the result of comparison performed by the first comparator 52 or regardless of the result of comparison performed by the first comparator 52. Here, the regularizing unit 44 regularizes a signal in a digital form resulting from the conversion performed by the ADC 46 and outputs the result of regularizing to the effective signal detection unit 48 and the motion amount detection unit 50.

After step 14, it is determined whether the motion sensed by the sensing unit 42 is an effective one, i.e., the intended one for information selection when the user moves the motion unit, in step 16. For this, if it is recognized that the amount of the sensed motion does not exceed the predetermined amount based on the result of comparison received from the first comparator 52, the effective signal detection unit 48 determines whether the motion of the motion unit 40 moved by the user is an effective one based on the result of sensing performed by the sensing unit 42 when the ADC 46 and the regularizing unit 44 are not provided, based on the result of conversion performed by the ADC 46 when the ADC 46 is provided as shown in FIG. 2, based on the result of regularization performed by the regularizing unit 44 when the ADC 46 is provided between the sensing unit 42 and the regularizing unit 44 in FIG. 2, or based on the result of conversion performed by the ADC 46 when the regularizing unit 44 is not provided in FIG. 2.

If it is determined that the motion of the motion unit 40 is not an effective one intended for information selection, the effective signal detection unit 48 controls the sensing unit 42 to sense a new motion. In contrast, if it is determined that the motion of the motion unit 40 is an effective one intended for information selection, the effective signal detection unit 48 generates an effective signal indicating that the motion of the motion unit 40 is an effective one and outputs the effective signal to the effective information determination unit 54.

For clarity of the present invention, on the assumption that the regularizing unit 44 and the ADC 46 are not provided, a preferred embodiment of step 16 shown in FIG. 1 and the structure and operations of a preferred embodiment of the effective signal detection unit 48 shown in FIG. 2 will be described with reference to the attached drawings. Even if the regularizing unit 44 and/or the ADC 46 are provided, descriptions of the embodiments will be the same as in the case where the regularizing unit 44 and the ADC 46 are not provided, with the exception that not the result of sensing but the result of regularization or a signal in a digital form is input to the effective signal detection unit 48.

Figure 3:
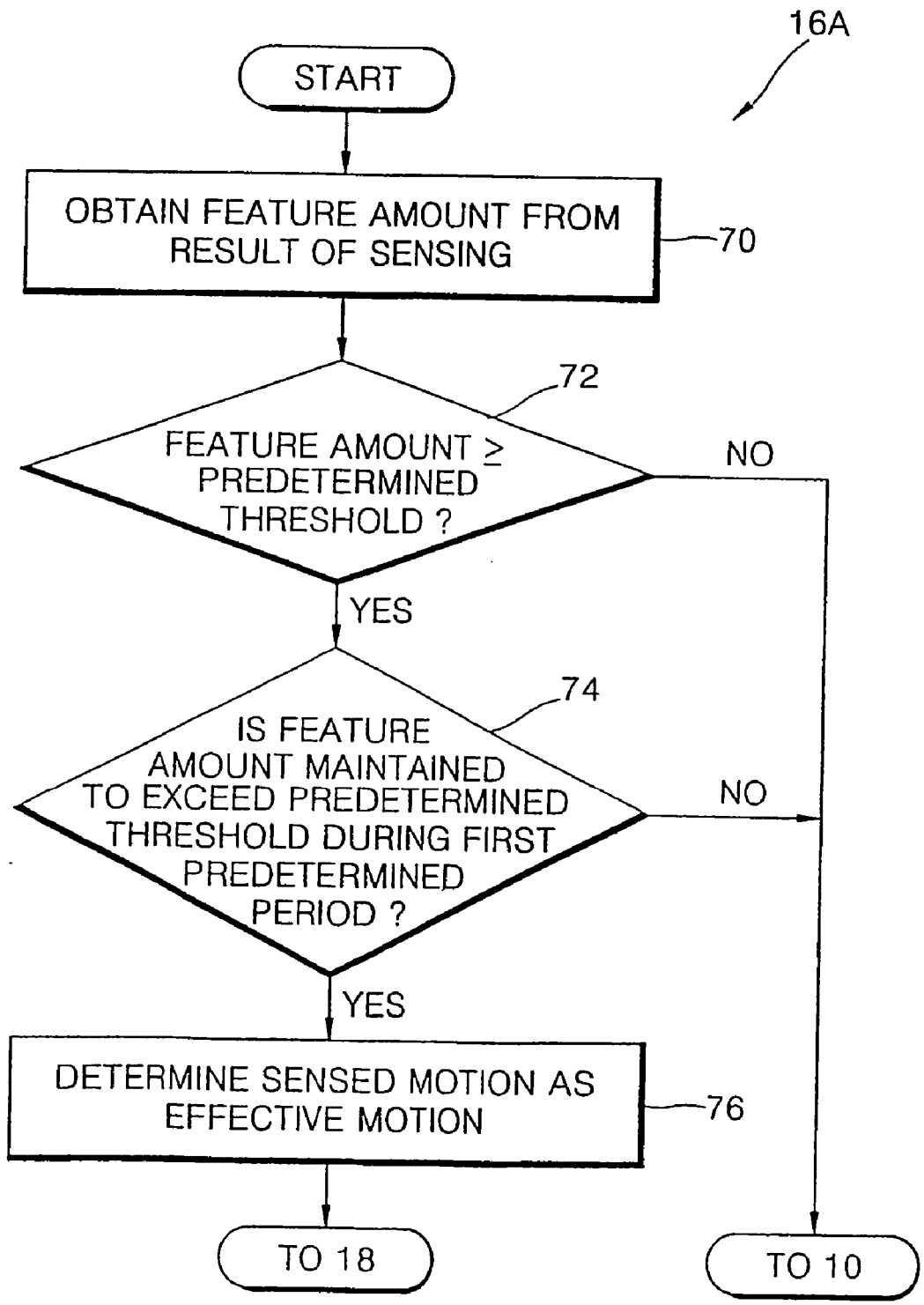
FIG. 3 is a flowchart of a preferred embodiment of step 16 of FIG. 1 according to the present invention.

FIG. 3 is a flowchart of a preferred embodiment 16A of step 16 of FIG. 1 according to the present invention. The embodiment 16A of step 16 includes determining the sensed motion as an effective motion according to a feature amount detected from the result of sensing and a period for which the detected feature amount is maintained in steps 70 through 76.

Figure 4:
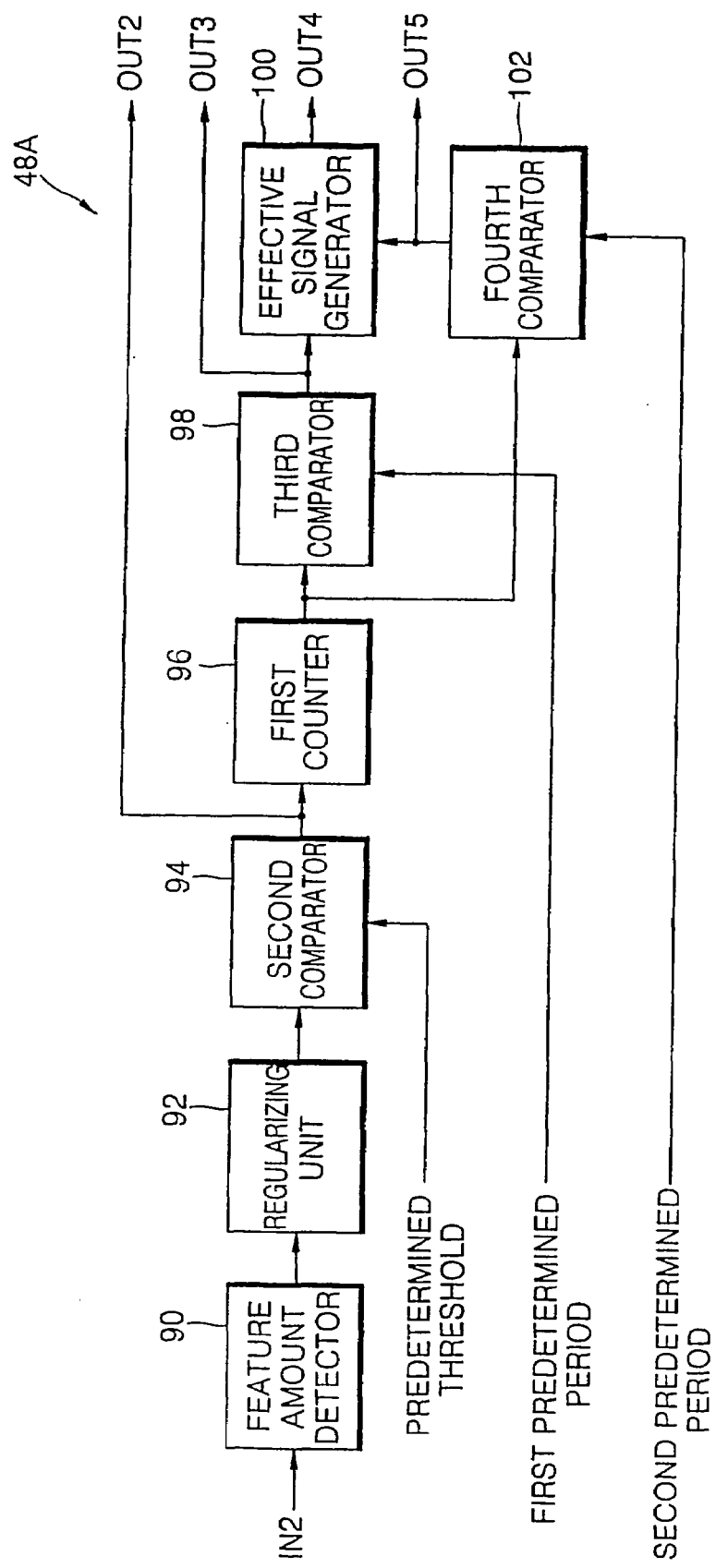
FIG. 4 is a block diagram of a preferred embodiment of an effective signal detection unit of FIG. 2 according to the present invention.

FIG. 4 is a block diagram of a preferred embodiment 48A of the effective signal detection unit 48 of FIG. 2 according to the present invention. The preferred embodiment 48A of the effective signal detection unit 48 includes a feature amount detector 90, a regularizing unit 92, a second comparator 94, a first counter 96, a third comparator 98, an effective signal generator 100, and a fourth comparator 102.

The feature amount detector 90 of FIG. 4 extracts a portion having a change in size from the result of sensing received through an input terminal IN2 as a feature amount and outputs the extracted feature amount in step 70. If there is no motion of the motion unit 40, the result of sensing has only a direct current component, so there is no portion having a change in the size of the result of sensing.

If only one motion is always sensed by the sensing unit 42 of FIG. 2, the regularizing unit 92 may not be provided. However, if a plurality of motions are sensed by the sensing unit 42, the regularizing unit 92 is provided as a substitute for the regularizing unit 44 of FIG. 2. In other words, only one of the regularizing units 44 and 92 can be selectively provided. The regularizing unit 92 regularizes the portion having a change in size, which has been extracted by the feature amount detector 90 in step 70, and outputs the result of regularization to the second comparator 94. The functions and operations of the regularizing units 44 and 92 shown in FIGS. 2 and 4, respectively, will be described in detail.

The regularizing unit 44 or 92 regularizes input data and can be realized as a multiplier (not shown) for multiplying the received sensing result by a weight and outputting the multiplication result as the result of regularization. For example, when it is assumed that the motion unit 40 is provided at each of a thumb, index finger, middle finger, ring finger, and little finger, a different amount of a motion is generated when clicking each finger, so the result of sensing is regularized to detect only the component having a change in size from the result of sensing as a feature amount. For this, a weight multiplied by the result of sensing the motion of the thumb is set to be larger than a weight multiplied by the result of sensing the motion of a finger other than the thumb, for example, the little finger. As described above, weights can be empirically determined in advance as having different values according to the motion degree of the motion unit 40. For example, the results of sensing the motions generated when clicking the thumb, index finger, middle finger, ring finger, and little finger, respectively, are examined in advance, and the results of examinations are analyzed to set different weights for different fingers.

Alternatively, according to the present invention, different weights can be set depending on an angle at which each finger is bent regardless of the kind of finger. For example, all angles at which the thumb, index finger, middle finger, ring finger, and little finger can be bent are examined, and the results of examinations are analyzed to set different weights for different angles.

Meanwhile, the structures and operations of embodiments of the feature amount detector 90 shown in FIG. 4 will be described with reference to the attached drawings.

Figure 5:
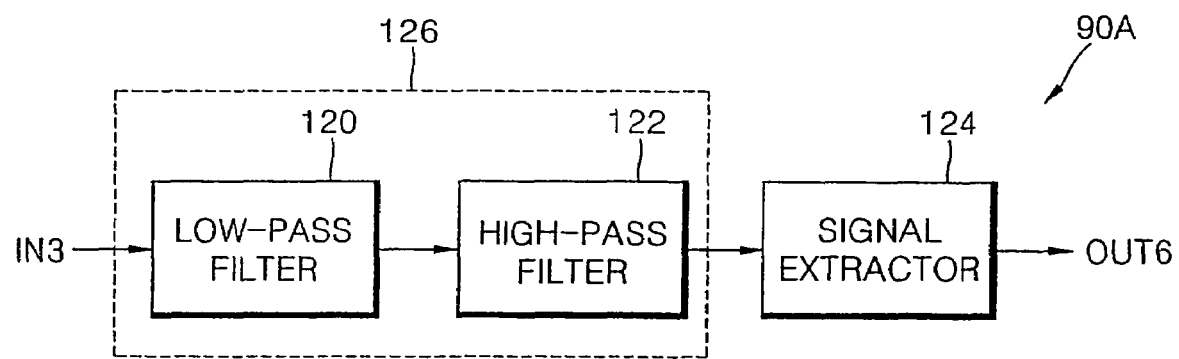
FIG. 5 is a block diagram of a first embodiment of a feature amount detector of FIG. 4 according to the present invention.

FIG. 5 is a block diagram of a first embodiment 90A of the feature amount detector 90 of FIG. 4 according to the present invention. The first embodiment 90A of the feature amount detector 90 includes a low-pass filter 120, a high-pass filter 122, and a signal extractor 124.

FIGS. 6A through 6C are waveform diagrams of signals input to or output from the respective parts of the feature amount detector 90A of FIG. 5. FIG. 6A is a waveform diagram of a signal input to the low-pass filter 120. FIG. 6B is a waveform diagram of a signal output from the low-pass filter 120. FIG. 6C is a waveform diagram of a signal output from the high-pass filter 122.

According to this embodiment of the present invention, a band pass filter 126 of the feature amount detector 90A band-pass filters the result of sensing received through an input terminal IN3, as shown in FIG. 6A, and outputs the result of band-pass filtering as a feature amount to the signal extractor 124. For this, as shown in FIG. 5, the band pass filter 126 can include the low-pass filter 120 and the high-pass filter 122. The low-pass filter 120 low-pass filters the result of sensing, which is shown in FIG. 6A and input through the input terminal IN3, and outputs the result of low-pass filtering shown in FIG. 6B to the high-pass filter 122, The high-pass filter 122 high-pass filters the result of low-pass filtering shown in FIG. 6B and outputs the result of high-pass filtering shown in FIG. 6C as a portion having a change in size of the result of sensing to the signal extractor 124. The signal extractor 124 extracts only the positive or negative component from the portion having a change in size shown in FIG. 6C, which is output from the high-pass filter 122, as a feature amount and outputs the extracted feature amount through an output terminal OUT6.

Figure 7:
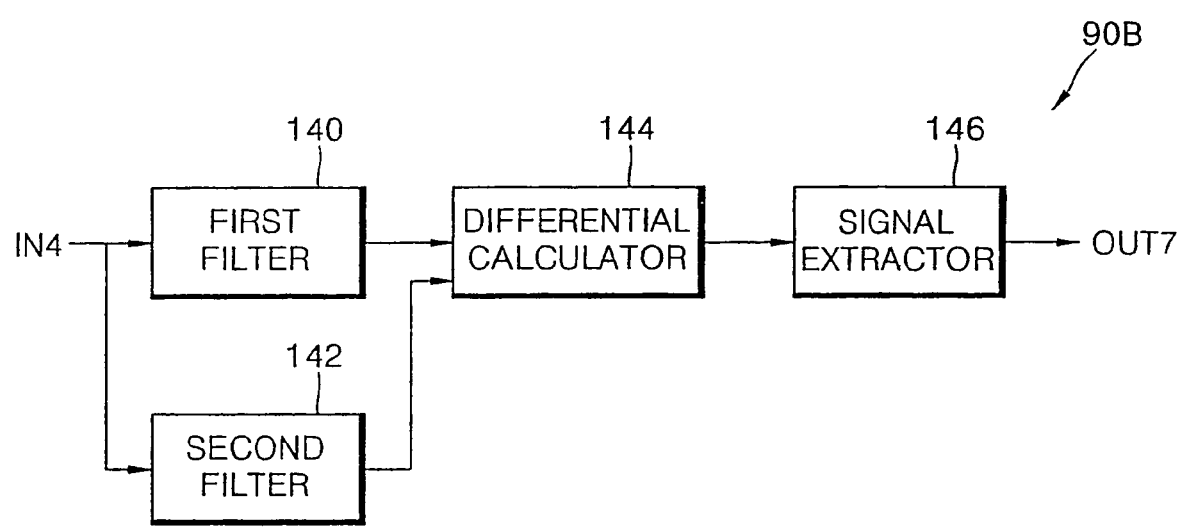
FIG. 7 is a block diagram of a second embodiment of a feature amount detector of FIG. 4 according to the present invention.

FIG. 7 is a block diagram of a second embodiment 90B of the feature amount detector 90 of FIG. 4 according to the present invention. The second embodiment 90B of the feature amount detector 90 includes first and second filters 140 and 142, a differential calculator 144, and a signal extractor 146.

According to this embodiment, the first filter 140 of the feature amount detector 90B filters a first frequency component of the result of sensing input through an input terminal IN4 and outputs the result of filtering to the differential calculator 144. The second filter 142 filters a second frequency component of the result of sensing input through the input terminal IN4 and outputs the result of filtering to the differential calculator 144. The differential calculator 144 calculates the difference between the result of filtering of the first filter 140 and the result of filtering of the second filter 142 and outputs the calculated difference to the signal extractor 146.

According to the present invention, each of the first and second frequency components filtered by the first and second filters 140 and 142, respectively, may be a low-band component, a high-band component, or just a band component. The first and second frequency components may be a low-band component and a high-band component, respectively, a low-band component and a band component, respectively, or a high-band component and a band component, respectively. For clarity of the present invention, when it is assumed that the first and second frequency components are low-band components, that the cutoff frequency $f_{c1}$ of the first filter 140 is 10 Hz, and that the cut-off frequency $f_{c2}$ of the second filter 142 is 4 Hz, the feature amount detector 90B of FIG. 7 generates a portion having a change in the size of the result of sensing as follows.

Figure 8A:
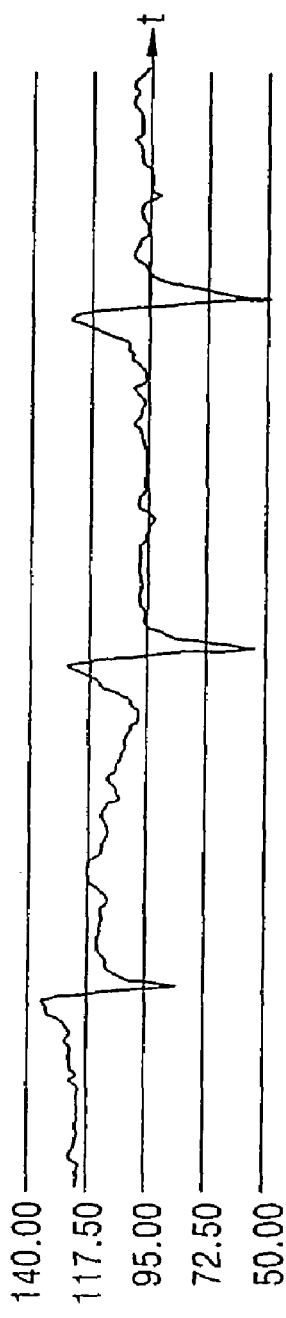
FIGS. 8A through 8D are waveform diagrams of the respective parts of FIG. 7.
Figure 8B:
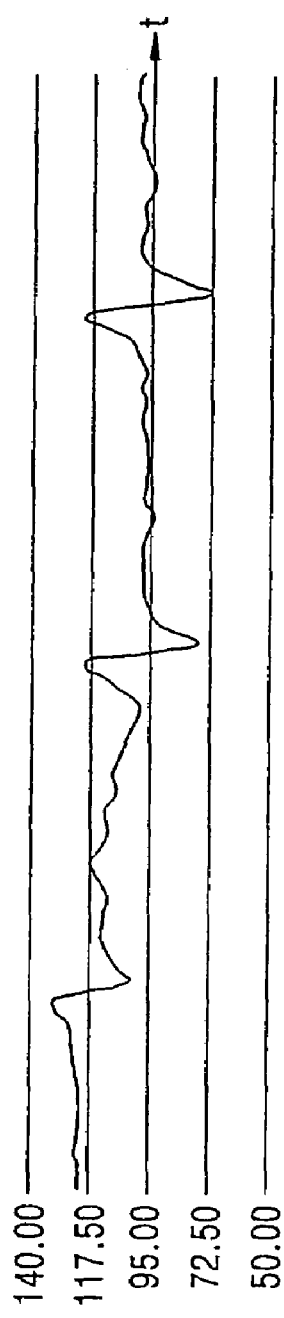
Figure 8C:
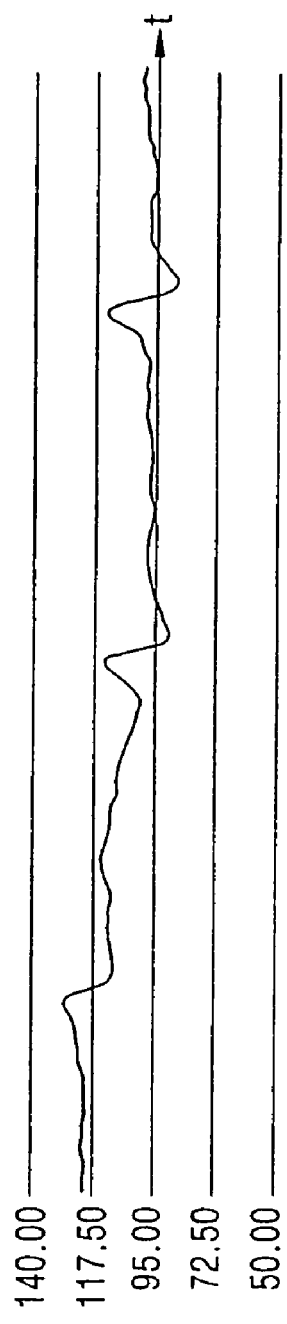
Figure 8D:
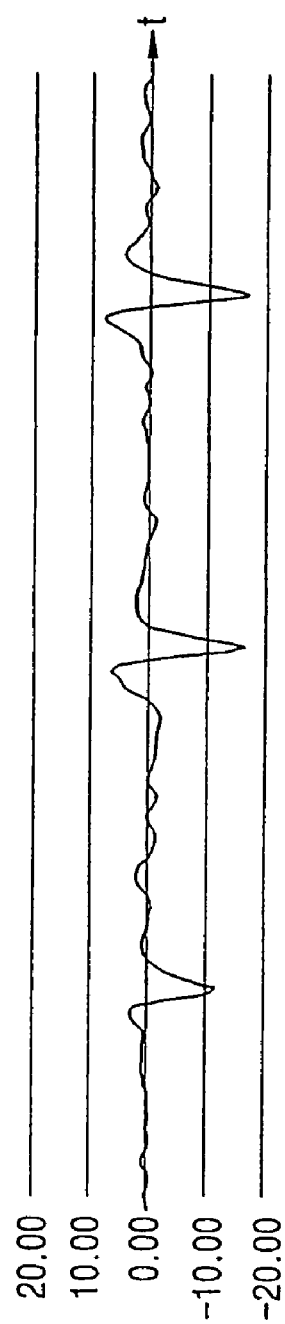

FIGS. 8A through 8D are waveform diagrams of the respective parts of FIG. 7. FIG. 8A is a waveform diagram of the result of sensing input to the first and second filters 140 and 142. FIG. 8B is a waveform diagram of the result of low-pass filtering of the first filter 140. FIG. 8C is a waveform diagram of the result of low-pass filtering of the second filter 142. FIG. 8D is a waveform diagram of a difference component output from the differential calculator 144.

The first filter 140 having the cut-off frequency $f_{c1}$ of 10 Hz low-pass filters the first frequency component of the result of sensing, which is input through the input terminal IN4 and shown in FIG. 8A, and outputs the result of filtering shown in FIG. 8B to the differential calculator 144. The second filter 142 having the cut-off frequency $f_{c2}$ of 4 Hz low-pass filters the second frequency component of the result of sensing, which is input through the input terminal IN4 and shown in FIG. 8A, and outputs the result of filtering shown in FIG. 8C to the differential calculator 144. The differential calculator 144 calculates the difference between the result of filtering of the first filter 140 shown in FIG. 8B and the result of filtering of the second filter 142 shown in FIG. 8C and outputs the calculated difference shown in FIG. 8D as the portion having a change in size of the result of sensing to the signal extractor 146. The signal extractor 146 extracts only the positive or negative component from the difference received from the differential calculator 144 as a feature amount and outputs the extracted feature amount through an output terminal OUT7.

Let us know suppose that the motion unit 40 is attached to the thumb of a glove-shaped member (not shown) and a user wearing the glove-shaped member on his/her hand clicks information by moving his/her thumb to the left or right. Here, since the thumb usually moves to the left and right when the user clicks the thumb, it is necessary to set only one direction effective in clicking. Otherwise, when the thumb is moved for one click, two clicks may be recognized. To recognize an effective motion only, the signal extractor 124 or 146 shown in FIG. 5 or 7 extracts a negative or positive component as a feature amount from the portion having a change in size.

Figure 9:
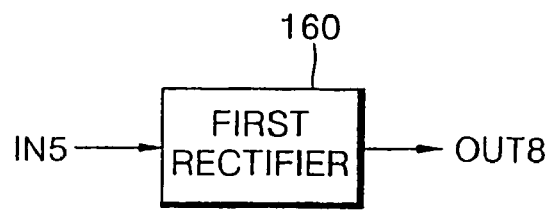
FIG. 9 is a block diagram of a first embodiment of a signal extractor of FIG. 5 or 7 according to the present invention.

FIG. 9 is a block diagram of a first embodiment of the signal extractor 124 or 146 of FIG. 5 or 7 according to the present invention. In this embodiment, the signal extractor 124 or 146 is realized as a first rectifier 160.

The first rectifier 160 shown in FIG. 9 rectifies the portion, which has a change in size of the result of sensing and is received from the high-pass filter 122 through an input terminal IN5, or the difference received from the differential calculator 144 through the input terminal IN5 and outputs the result of rectification as the feature amount through an output terminal OUT8. Accordingly, only the portion having a change in size of the result of sensing output from the high-pass filter 122 or only the positive component of the difference output from the differential calculator 144 can be extracted as the feature amount.

Figure 10:
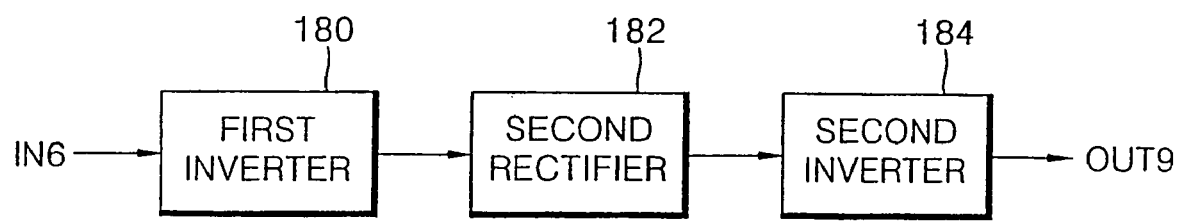
FIG. 10 is a block diagram of a second embodiment of a signal extractor of FIG. 5 or 7 according to the present invention.

FIG. 10 is a block diagram of a second embodiment of the signal extractor 124 or 146 of FIG. 5 or 7 according to the present invention. In this embodiment, the signal extractor 124 or 146 includes a first inverter 180, a second rectifier 182, and a second inverter 184.

The first inverter 180 shown in FIG. 10 inverts the portion, which has a change in the size of the result of sensing and is received from the high-pass filter 122 through an input terminal IN6, or the difference received from the differential calculator 144 through the input terminal IN6 and outputs the result of inversion to the second rectifier 182. The second rectifier 182 rectifies the result of inversion received from the first inverter 180 and outputs the result of rectification to the second inverter 184. The second inverter 184 inverts the result of rectification received from the second rectifier 182 and outputs the result of inversion as the feature amount through an output terminal OUT9. Accordingly, only the size-changed portion of the result of sensing output from the high-pass filter 122 or only the negative component of the difference output from the differential calculator 144 can be extracted as the feature amount.

Meanwhile, after step 70 shown in FIG. 3, it is determined whether the feature amount is equal to or greater than a predetermined threshold in step 72. The predetermined threshold is previously set according to the motion range of the motion unit 40 can be moved. For example, when the motion unit 40 is attached to a user's each finger, the amplitudes of feature amounts detected when each finger is clicked are acquired in advance, and the predetermined threshold can be set based on the result of analyzing the acquired amplitudes of the feature amounts, that is, the motion degrees of the fingers.

To perform step 72, the second comparator 94 compares the feature amount received from the feature amount detector 90 with the externally received predetermined threshold and outputs the result of comparison to the first counter 96 and to the sensing unit 42 through an output terminal OUT2. If it is determined that the feature amount is less than the predetermined threshold, the procedure goes to step 10. For this, the sensing unit 42 senses a new motion of the motion unit 40 when the feature amount is recognized as being less than the predetermined threshold based on the result of comparison performed by the second comparator 94.

Figure 11:
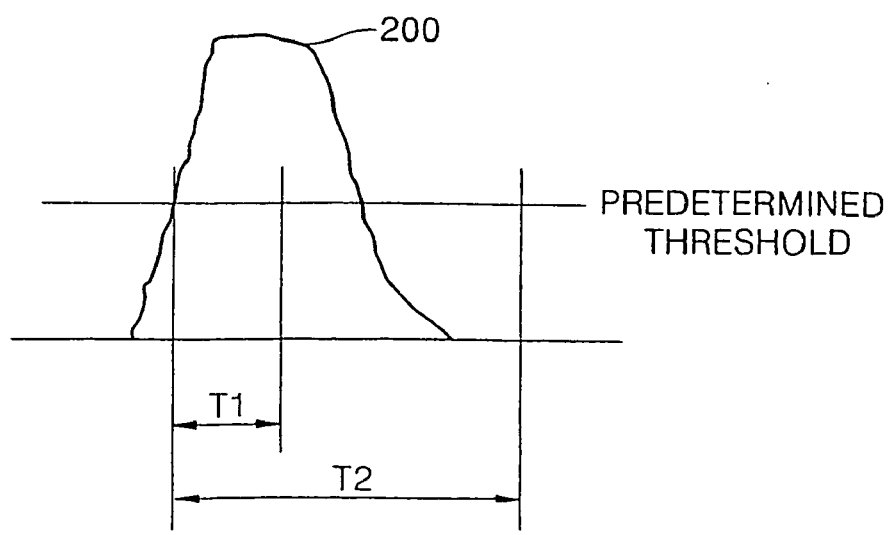
FIG. 11 is a waveform diagram showing the first and second predetermined periods for explaining steps 74 and 76 shown in FIG. 3.

FIG. 11 is a waveform diagram showing first and second predetermined periods T1 and T2 for explaining steps 74 and 76 shown in FIG. 3. The vertical axis refers to time, and the horizontal axis refers to amplitude values.

Referring to FIG. 11, if it is determined that a feature amount 200 is at least of the same value as the predetermined threshold, it is determined whether the feature amount 200 is maintained to be at least the predetermined threshold during the first predetermined period T1 in step 74. To perform step 74, the effective signal detection unit 48A can be further provided with the first counter 96 and the third comparator 98. The first counter 96 performs a counting operation in response to the result of comparison received from the second comparator 94 and outputs the result of counting to the third comparator 98. For example, the first counter 96 performs a counting operation when recognizing that the feature amount is at least of the same value as the predetermined threshold based on the result of comparison performed by the second comparator 94 and does not perform the counting operation when it is recognized that the feature amount 200 is less than the predetermined threshold. Then, the third comparator 98 compares the result of counting received from the first counter 96 with the first predetermined period T1 externally received and outputs the result of comparison to the effective signal generator 100 and to the sensing unit 42 through an output terminal OUT3.

If it is determined that the feature amount 200 is not maintained to be at least the predetermined threshold for the first predetermined period T1, the procedure goes to step 10. For this, the sensing unit 42 senses a new motion of the motion unit 40 if it is determined that the feature amount 200 is not maintained to be at least the predetermined threshold for the first predetermined period T1 based on the result of comparison performed by the third comparator 98. This is because a feature amount should be maintained to be at least a predetermined threshold for at least the first predetermined period T1 in order to determine a user's motion as an intentional motion to select information. Otherwise, the user's motion is not determined as an intentional effective motion.

In contrast, if it is determined that the feature amount 200 is maintained to be at least the predetermined threshold for the first predetermined period T1, the sensed motion of the motion unit 40 is determined as an effective motion in step 76, and the procedure goes to step 18. Here, the first predetermined period T1 is set to the minimum time taken for the user to move the motion unit 40 to intentionally select information. For performing step 76, the effective signal generator 100 generates an effective signal indicating that the motion of the motion unit 40 is an effective motion in response to the result of comparison received from the third comparator 98 and outputs the effective signal to the effective information determination unit 54 through an output terminal OUT4. Here, if it is determined that the feature amount 200 is maintained to be at least the predetermined threshold for the first predetermined period T1 based on the result of comparison of the third comparator 98, the sensing unit 42 may not sense a new motion of the motion unit 40 or may not output the result of sensing.

Step 74 may be selectively provided. Accordingly, the first counter 96 and the third comparator 98 of FIG. 4 may also be selectively provided. In this case, the effective signal generator 100 generates an effective signal in response to the result of comparison received from the second comparator 94. For example, the effective signal generator 100 generates an effective signal if it is determined that the feature amount 200 is at least of the same value as the predetermined threshold based on the result of comparison received from the second comparator 94 and does not generate an effective signal if it is determined that the feature amount 200 is less than the predetermined threshold.

Meanwhile, according to the present invention, when it is determined whether the sensed motion is effective in step 16, the result of sensing obtained for a period other than the first predetermined period T1 in the second predetermined period T2 of FIG. 11 is not used because undesirable cross-talk or noise may occur when the user selects information. For example, when the user having the motion unit 40 attached to each finger moves the middle finger in order to input desired information, the ring finger may be moved together, which causes cross-talk occurrence. To prevent such crosstalk from occurring, the effective signal detection unit 48A can be provided with the fourth comparator 102. The fourth comparator 102 compares the result of counting received from the first counter 96 with the second predetermined period T2 received externally and outputs the result of comparison to the effective signal generator 100 and to the sensing unit 42 through an output terminal OUT5. Then, the effective signal generator 100 generates an effective signal in response to the result of comparison received from the fourth comparator 102. For example, if it is recognized that the second predetermined period T2 has not elapsed since the first predetermined period T1 elapsed, based on the result of comparison performed by the fourth comparator 102, the effective signal generator 100 does not generate a new effective signal even if it is recognized that the feature amount 200 is at least of the same value as the predetermined threshold based on the result of comparison of the second comparator 94. According to the present invention, if it is recognized that a current time is in the period other than the first predetermined period T1 in the second predetermined period T2 based on the result of comparison performed by the fourth comparator 102, the sensing unit 42 may not sense a new motion of the motion unit 40 or may not output the result of sensing. This is for preventing the sensing unit 42 from unnecessarily performing a sensing operation during the period other than the first predetermined period T1 in the second predetermined period T2. According to the present invention, the second predetermined period T2 is set according to a time period for which the motion unit 40 may be unnecessarily moved when the user selects information. Alternatively, the second predetermined period T2 may be set to be different depending on the type of motion unit 40. For example, when it is assumed that the motion unit 40 is attached to each finger of the user's hands and a clicking motion is performed by moving the thumb, the second predetermined period T2 is set to be longer than it is set on the assumption that the clicking operation is performed by moving a finger other than the thumb, in order to prevent two feature amounts from being detected. Here, since the thumb is moved two times to the left and right for the clicking motion unlike the other fingers, two feature amounts may be detected. According to the present invention, the fourth comparator 102 shown in FIG. 4 can be selectively provided. In this case, the effective signal generator 100 generates an effective signal in response to only the result of comparison received from the third comparator 98 regardless of whether the second predetermined period T2 has elapsed.

The effective information determination unit 54 of FIG. 2 determines the information received through an input terminal IN1 as effective information in response to the effective signal received from the effective signal detection unit 48 and outputs the effective information through an output terminal OUT1 in step 18. For example, if it is recognized that the motion of the motion unit 40 is an effective motion based on the effective signal, the effective information determination unit 54 determines the information, which is selected by the effective motion and received through the input terminal IN1, as effective information and outputs the determined information through the output terminal OUT1. However, if it is recognized that the motion of the motion unit 40 is not an effective motion based on the effective signal, the effective information determination unit 54 determines the information, which is selected by the motion of the motion unit 40 and received through the input terminal IN1, as ineffective information.

For example, the effective information determination unit 54 shown in FIG. 2 may be applied as an information selection unit which is disclosed in the Korean Patent Application No. 2001-41560 mentioned above. In such an application, the effective information determination unit 54 establishes a one-dimensional position of an information screen from a first and/or second displacement and an angle, determines the information, which is located at the established one-dimensional position and received through the input terminal IN1, as effective information selected by the user in response to the effective signal received from the effective signal detection unit 48, and outputs the established effective information through the output terminal OUT1.

More specifically, the effective information determination unit 54 acts as an information recognizer disclosed in the Korean Patent Application No. 2001-41560. In other words, the effective information determination unit 54 searches for the information which is mapped to a one-dimensional position designated by a user on the information screen, recognizes the searched information which is received through the input terminal IN1 as effective information which is selected by the user in response to the effective signal received from the effective signal detection unit 48, and outputs the recognized effective information through the output terminal OUT1. Alternatively, the effective information determination unit 54 searches for the information, which is mapped to the horizontal and vertical coordinate values corresponding to a two-dimensional position determined from the horizontal and vertical positions of information designated by the user on the information screen, recognizes the searched information which is received through the input terminal IN1 as effective information which is selected by the user in response to the effective signal received from the effective signal detection unit 48, and outputs the recognized effective information through the output terminal OUT1.

Meanwhile, at least two effective motions may be detected. For example, when the motion unit 40 is provided at each finger, the clicking motion of a middle finger can be accompanied with the motion of a ring finger and the motion of a little finger. In this case, the unintentional motions of the ring and little fingers must be considered as ineffective motions. Otherwise, the motions of the ring and little fingers may act as cross-talk when it is determined whether the motion of the middle finger is an effective motion.

Hereinafter, in the case where at least two effective motions are generated, an information selection method according to the present invention and the structure and operations of an information selection apparatus according to the present invention for performing the above method will be described with reference to the attached drawings.

Figure 12:
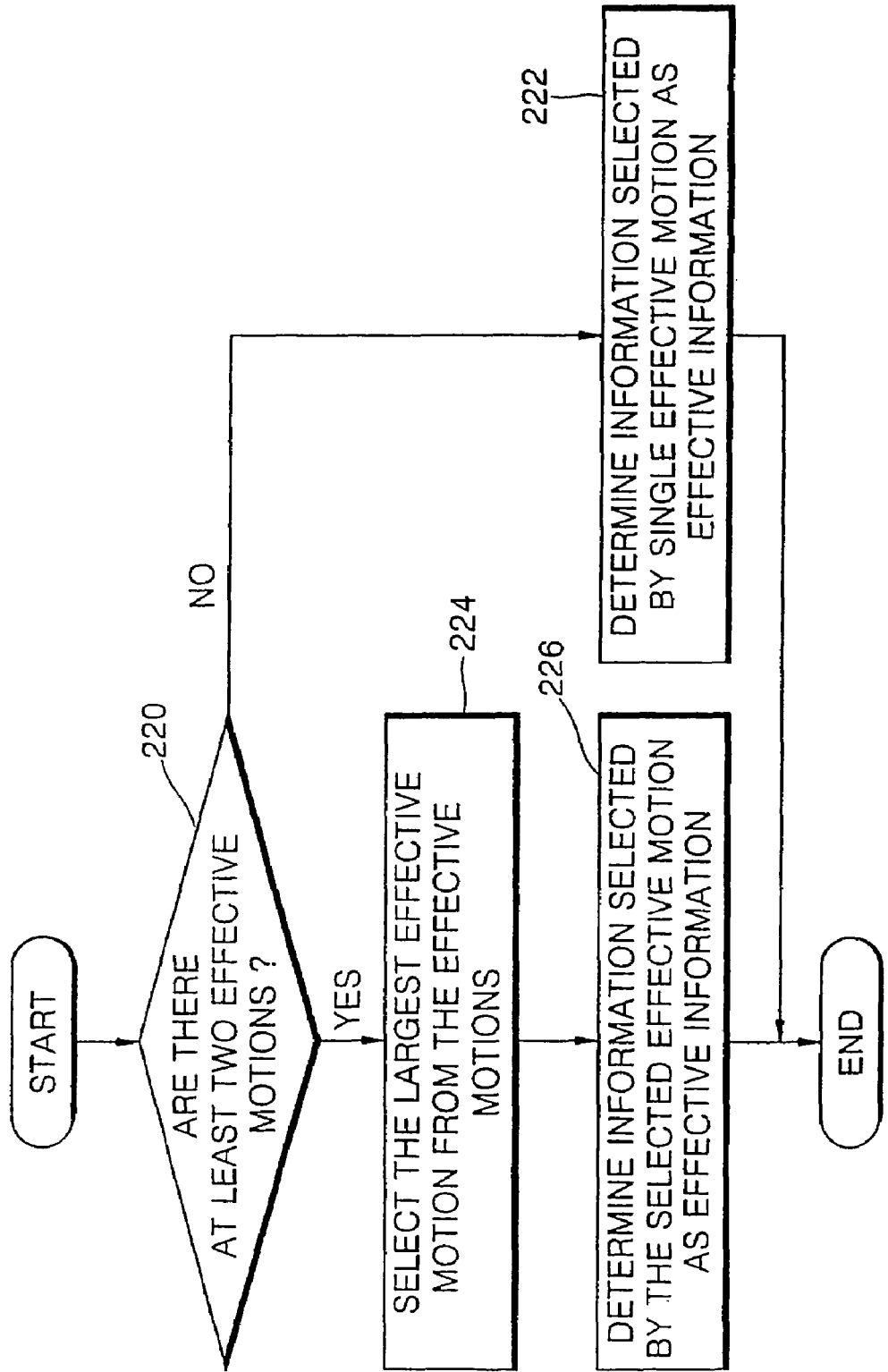
FIG. 12 is a flowchart of a first embodiment of an information selection method according to the present invention when at least two effective motions are generated.

FIG. 12 is a flowchart of a first embodiment of an information selection method according to the present invention when at least two effective motions are generated. In this embodiment, the information selection method includes determining effective information using one motion among a plurality of effective motions in steps 220 through 226.

Figure 13:
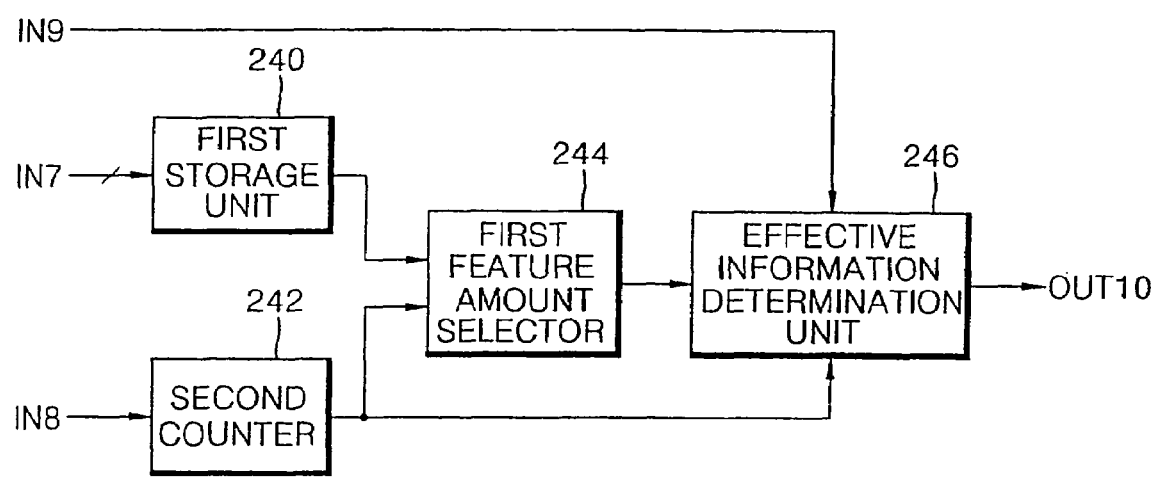
FIG. 13 is a block diagram of an information selection apparatus for performing the method of FIG. 12 according to the present invention.

FIG. 13 is a block diagram of an information selection apparatus for performing the method of FIG. 12 according to the present invention. The information selection apparatus includes a first storage unit 240, a second counter 242, a first feature amount selector 244, and an effective information determination unit 246.

If it is determined that the motion of the motion unit 40 is an effective motion in step 16 shown in FIG. 1, it is determined whether there are at least two effective motions in step 220. For this, the second counter 242 counts the number of effective signals received from the effective signal detection unit 48 through an input terminal IN8 and outputs the result of counting to the first feature amount selector 244 and to the effective information determination unit 246.

If it is determined that there are at least two effective motions, the largest effective motion is selected from the effective motions in step 224. For this, the first storage unit 240 receives one or more feature amounts corresponding to one or more effective motions from the feature amount detector 90 through an input terminal IN7 and stores the one or more feature amounts. The first feature amount selector 244 selects the biggest feature amount from the feature amounts stored in the first storage unit 240 in response to the result of counting received from the second counter 242 and outputs the selected feature amount to the effective information determination unit 246. For example, only if it is recognized that there are at least two effective motions based on the result of counting received from the second counter 242, the first feature amount selector 244 performs step 224.

The steps 220 and 224 may be performed between steps 16 and 18 shown in FIG. 1. The first storage unit 240, the second counter 242, and the first feature amount selector 244 shown in FIG. 13 may be provided between the effective signal detection unit 48 and the effective information determination unit 54 shown in FIG. 2. In this case, the effective information determination unit 246 acts as the effective information determination unit 54.

Here, if it is determined that there are not at least two effective motions based on the result of counting performed by the second counter 242, the effective information determination unit 246 determines the information, which is selected by a single effective motion and received through an input terminal IN9, as effective information and outputs the determined effective information through an output terminal OUT10 in step 222. Alternatively, if it is determined that there are at least two effective motions based on the result of counting performed by the second counter 242, after step 224, the effective information determination unit 246 determines information, which is selected by an effective motion corresponding to the feature amount selected by the first feature amount selector 244 from a plurality of pieces of information which are selected by the effective motions and received through the input terminal IN9, as the effective information and outputs the determined effective information through the output terminal OUT10 in step 226.

Figure 14:
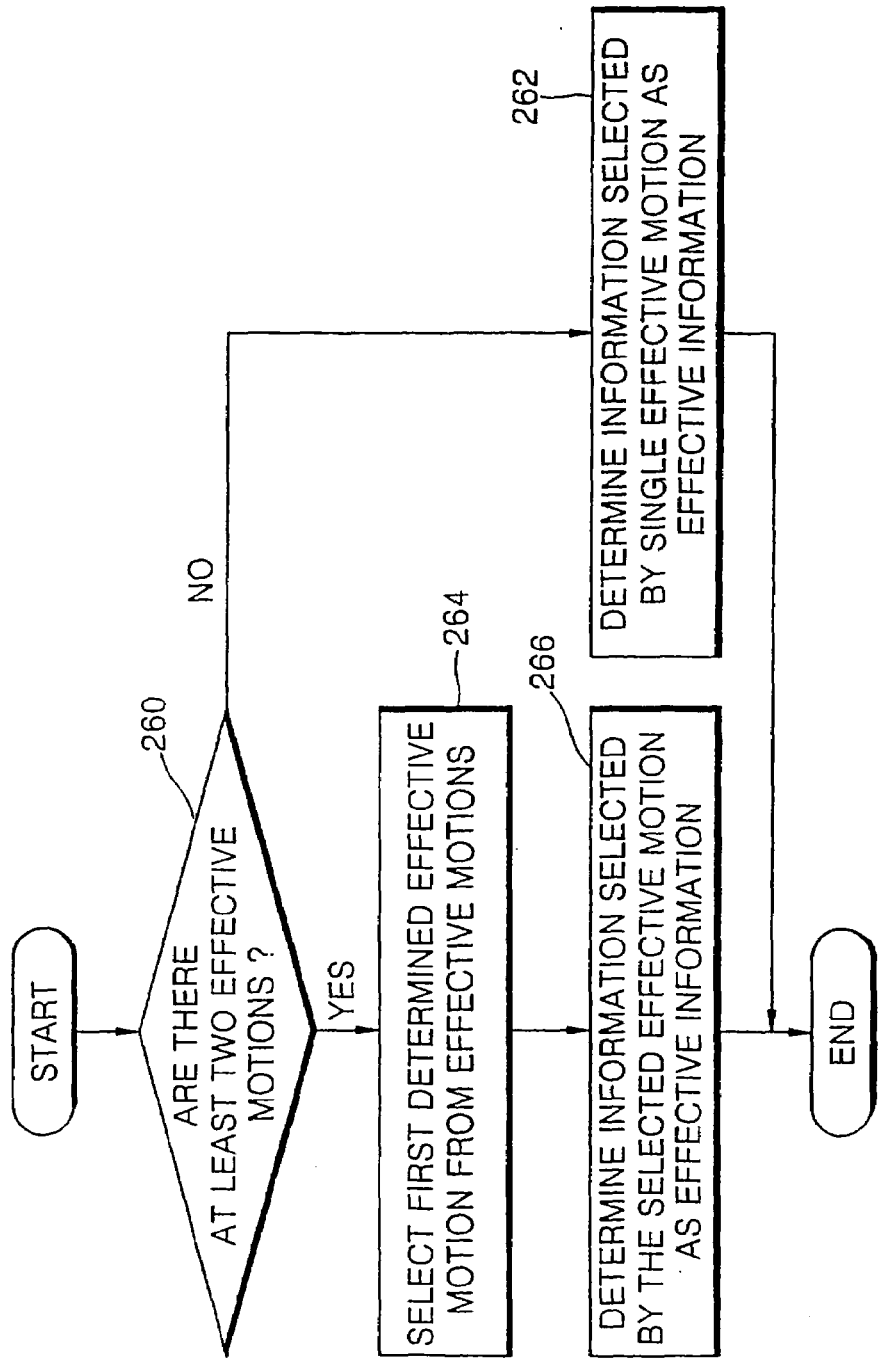
FIG. 14 is a flowchart of a second embodiment of an information selection method according to the present invention when at least two effective motions are generated.

FIG. 14 is a flowchart of a second embodiment of an information selection method according to the present invention when at least two effective motions are generated. In this embodiment, the information selection method includes determining the effective information using one motion among a plurality of effective motions, in steps 260 through 266.

Figure 15:
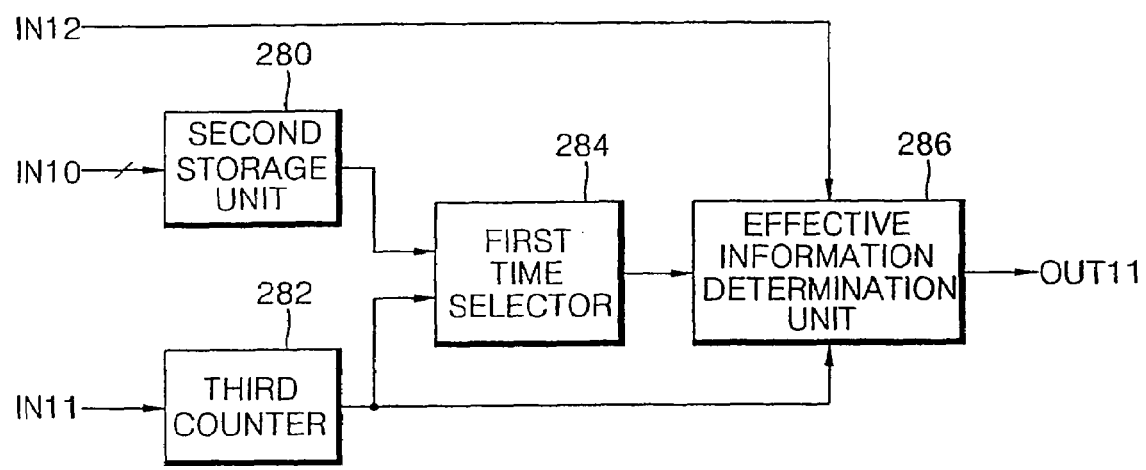
FIG. 15 is a block diagram of an information selection apparatus for performing the method of FIG. 14 according to the present invention.

FIG. 15 is a block diagram of an information selection apparatus for performing the method of FIG. 14 according to the present invention. The information selection apparatus includes a second storage unit 280, a third counter 282, a first time selector 284, and an effective information determination unit 286.

If it is determined that the motion of the motion unit 40 is an effective motion in step 16 shown in FIG. 1, it is determined whether there are at least two effective motions in step 260. For this, the third counter 282 counts the number of effective signals received from the effective signal detection unit 48 through an input terminal IN11 and outputs the result of counting to the first time selector 284 and to the effective information determination unit 286.

If it is determined that there are at least two effective motions, a first determined effective motion is selected from the effective motions in step 264, and the procedure goes to step 266.

For clarity of step 264, it is assumed that the motion unit 40 is attached to each finger of a user's hands intending to select information, and information is selected by moving one of the user's fingers. Here, at least one finger near to a finger which is intentionally moved may be moved together or following with the intentionally moved finger regardless of the user's intention. Accordingly, in step 264 it is determined which finger is intentionally moved based on the fact that a feature amount generated by the motion of the intentionally moved finger is detected prior to a feature amount generated by the motion of a near finger. To perform step 264, the second storage unit 280 stores points (that is, instants of time) when one or more feature amounts corresponding to one or more effective motions are received from the feature amount detector 90 through an input terminal IN10. The first time selector 284 selects an earliest time from the instants of time stored in the second storage unit 280 in response to the result of counting received from the third counter 282 and outputs the selected time to the effective information determination unit 286. For example, only if it is recognized that there are at least two effective motions based on the result of counting received from the third counter 282, the first time selector 284 performs step 264. Steps 260 and 264 may be performed between steps 16 and 18 shown in FIG. 1. The second storage unit 280, the third counter 282, and the first time selector 284 shown in FIG. 15 may be provided between the effective signal detection unit 48 and the effective information determination unit 54 shown in FIG. 2. In this case, the effective information determination unit 286 acts as the effective information determination unit 54.

Here, if it is determined that there are not at least two effective motions based on the result of counting performed by the third counter 282, the effective information determination unit 286 determines the information, which is selected by a single effective motion and received through an input terminal IN12, as effective information and outputs the determined effective information through an output terminal OUT11 in step 262. Alternatively, if it is determined that there are at least two effective motions based on the result of counting performed by the third counter 282, after step 264, the effective information determination unit 286 determines the information, which is selected by the first determined effective motion corresponding to a feature amount generated at the time selected by the first time selector 284 from a plurality of pieces of information which are selected by the effective motions and received through the input terminal IN12, as the effective information and outputs the determined effective information through the output terminal OUT11 in step 266.

Figure 16:
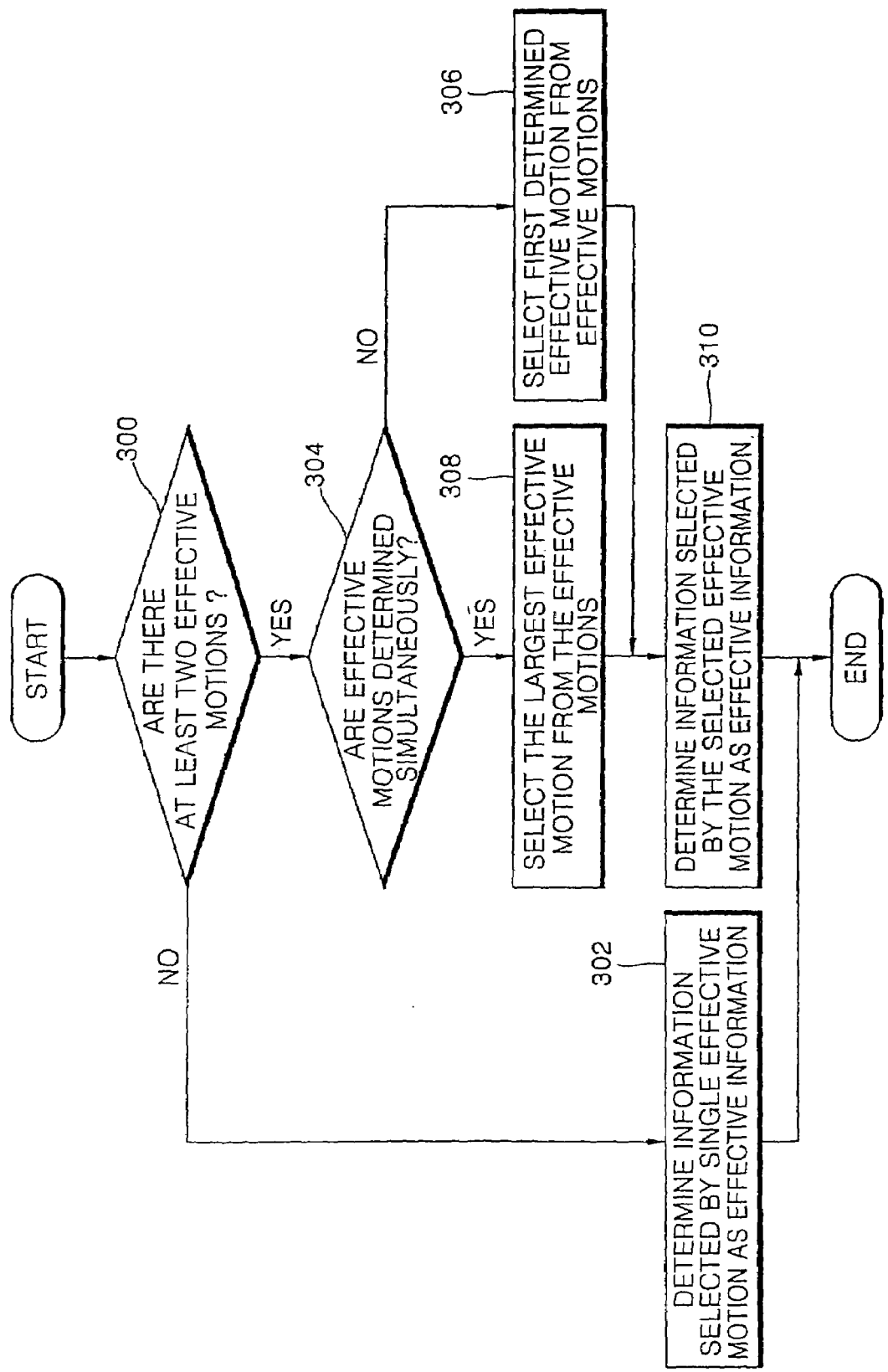
FIG. 16 is a flowchart of a third embodiment of an information selection method according to the present invention when at least two effective motions are generated.

FIG. 16 is a flowchart of a third embodiment of an information selection method according to the present invention when at least two effective motions are generated. In this embodiment, the information selection method includes determining the effective information using one motion among a plurality of effective motions, in steps 300 through 310.

Figure 17:
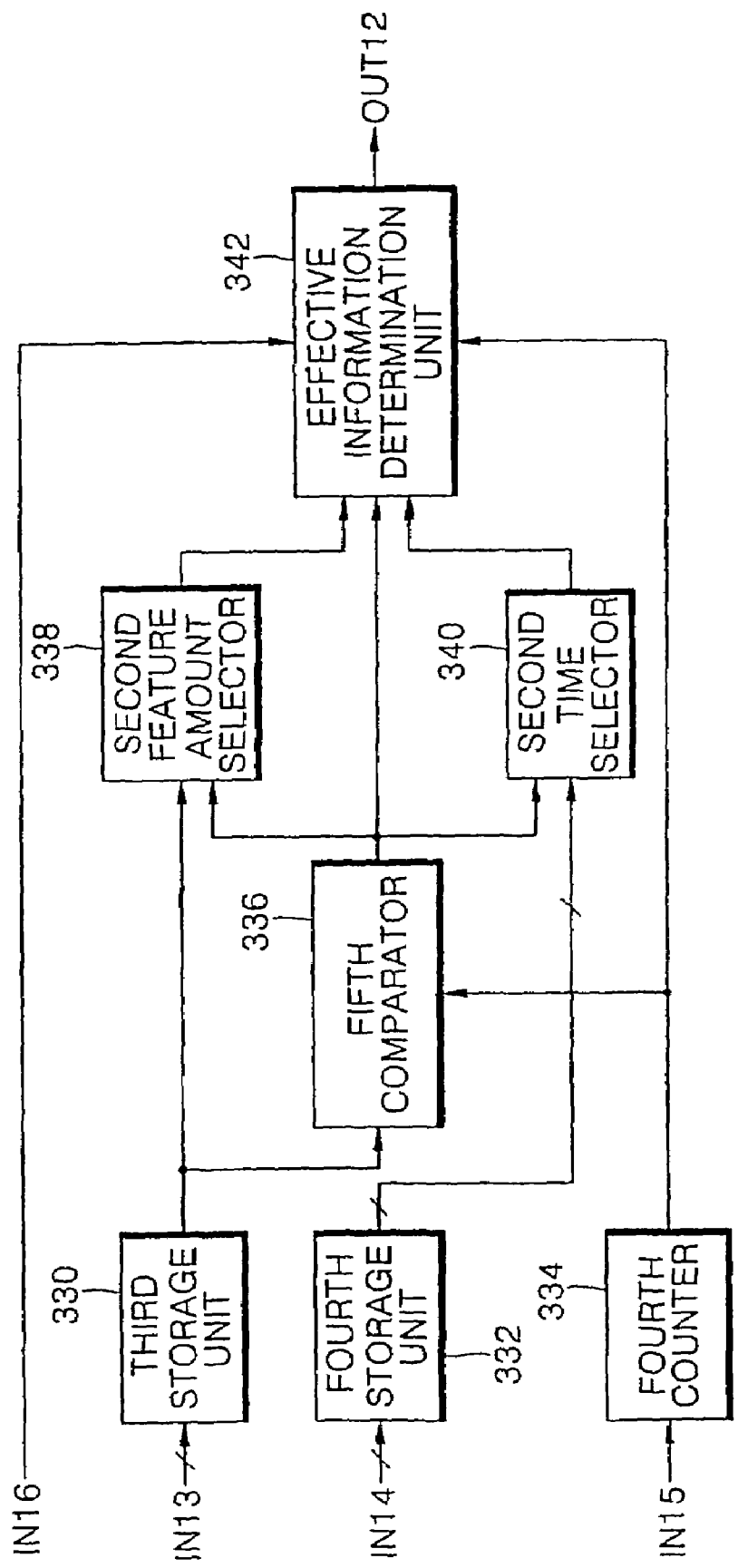
FIG. 17 is a block diagram of an information selection apparatus for performing the method of FIG. 16 according to the present invention.

FIG. 17 is a block diagram of an information selection apparatus for performing the method of FIG. 16 according to the present invention. The information selection apparatus includes a third storage unit 330, a fourth storage unit 332, a fourth counter 334, a fifth comparator 336, a second feature amount selector 338, a second time selector 340, and an effective information determination unit 342.

If it is determined that the motion of the motion unit 40 is an effective motion in step 16 shown in FIG. 1, it is determined whether there are at least two effective motions in step 300. For this, the fourth counter 334 counts the number of effective signals received from the effective signal detection unit 48 through an input terminal IN15 and outputs the result of counting to the fifth comparator 336 and to the effective information determination unit 342.

If it is determined that there are at least two effective motions, it is determined whether the effective motions are determined simultaneously in step 304. For this, the fourth storage unit 332 stores instants of time when one or more feature amounts corresponding to one or more effective motions are received from the feature amount detector 90 through an input terminal IN12. The fifth comparator 336 compares the instants of time stored in the fourth storage unit 332 and outputs the result of comparison to the second feature amount selector 338, the second time selector 340, and the effective information determination unit 342. According to the present invention, the fifth comparator 336 may perform a comparison operation in response to the result of counting received from the fourth counter 334. For example, if it is recognized that there are not at least two effective motions based on the result of counting performed by the fourth counter 334, the fifth comparator 336 does not perform the comparison operation.

If it is determined that the effective motions are not determined simultaneously, a first determined effective motion is selected from the effective motions in step 306, and the procedure goes to step 310. Like step 264, step 306 is performed based on the fact that a feature amount corresponding to the first determined effective motion is first detected by the feature amount detector 90. To perform step 306, the second time selector 340 selects the earliest instant of time from the instants of time stored in the fourth storage unit 332 in response to the result of comparison received from the fifth comparator 336 and outputs the selected instant of time to the effective information determination unit 342. For example, only if it is recognized that the effective motions are not determined simultaneously based on the result of comparison received from the fifth comparator 336, the second time selector 340 performs step 306.

If it is determined that the effective motions are determined simultaneously, the largest effective motion is selected from the effective motions in step 308, and the procedure goes to step 310. For this, the third storage unit 330 receives one or more feature amounts corresponding to one or more effective motions from the feature amount detector 90 through an input terminal IN13 and stores the one or more feature amounts. The second feature amount selector 338 selects a biggest feature amount from among the feature amounts stored in the third storage unit 330 in response to the result of comparison received from the fifth comparator 336 and outputs the selected feature amount to the effective information determination unit 342. For example, only if it is recognized that the effective motions are determined simultaneously based on the result of comparison received from the fifth comparator 336, the second feature amount selector 338 performs step 308.

The steps 300 through 308 may be performed between steps 16 and 18 shown in FIG. 1. The third and fourth storage units 330 and 332, the fourth counter 334, the fifth comparator 336, the second feature amount selector 338, and the second time selector 340 shown in FIG. 17 may be provided between the effective signal detection unit 48 and the effective information determination unit 54 shown in FIG. 2. In this case, the effective information determination unit 342 acts as the effective information determination unit 54.

Here, if it is determined that there are not at least two effective motions based on the result of counting performed by the fourth counter 334, the effective information determination unit 342 determines the information, which is selected by a single effective motion and received through an input terminal IN16, as effective information and outputs the determined effective information through an output terminal OUT12 in step 302. Alternatively, if it is determined that there are at least two effective motions based on the result of counting performed by the fourth counter 334, after step 306 or 308, the effective information determination unit 342 determines the information, which is selected by the effective motion corresponding to the feature amount selected by the second feature amount selector 338 or the feature amount generated at the instant of time selected by the second time selector 340 from a plurality of pieces of information which are selected by the effective motions and received through the input terminal IN16, as the effective information in response to the result of comparison received from the fifth comparator 336 and outputs the determined effective information through the output terminal OUT12 in step 310.

Figure 18:
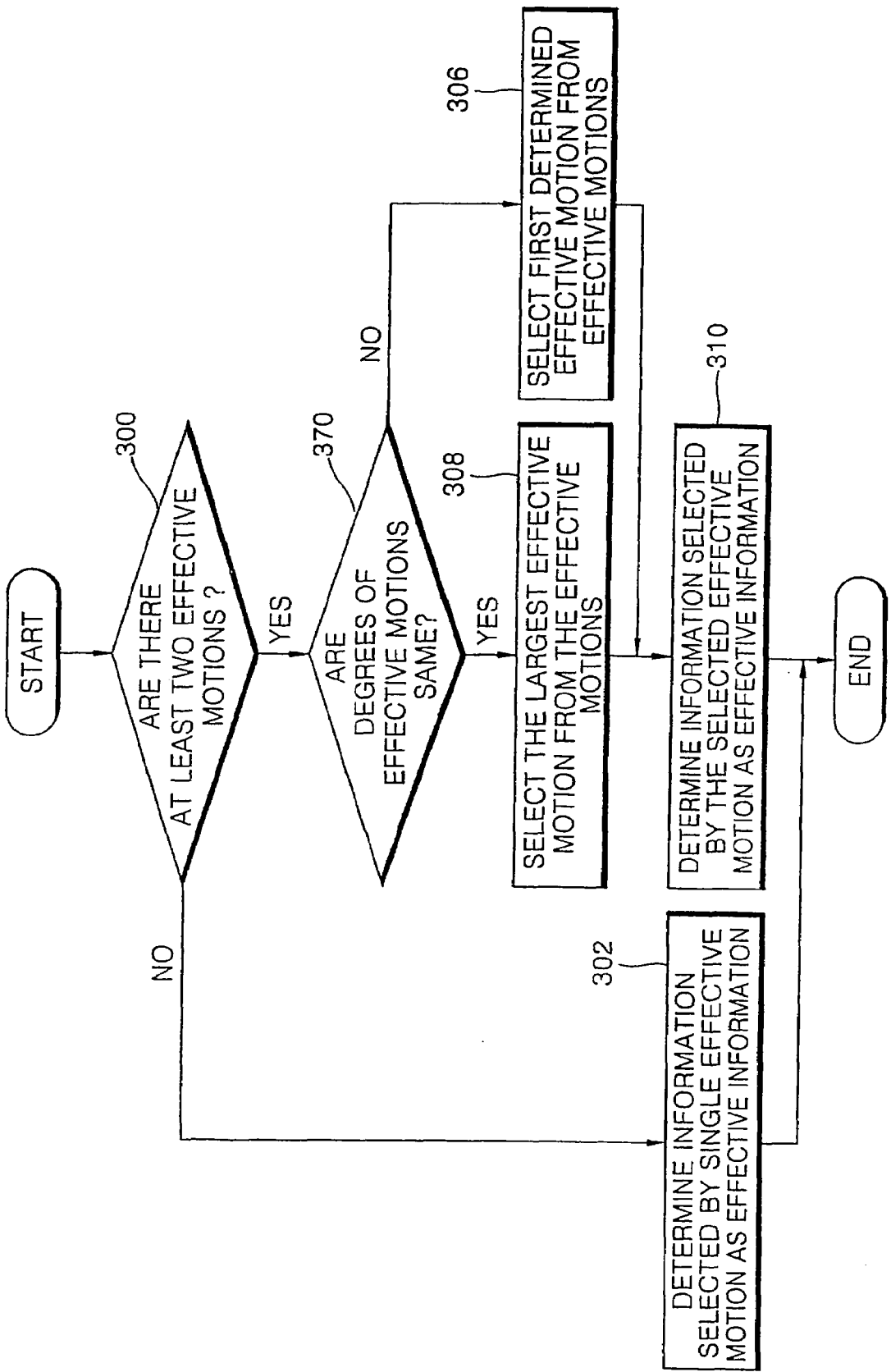
FIG. 18 is a flowchart of a fourth embodiment of an information selection method according to the present invention when at least two effective motions are generated.

FIG. 18 is a flowchart of a fourth embodiment of an information selection method according to the present invention when at least two effective motions are generated. In this embodiment, the information selection method includes determining the effective information using one motion, among a plurality of effective motions, in steps 300, 306 through 310, and 370.

Figure 19:
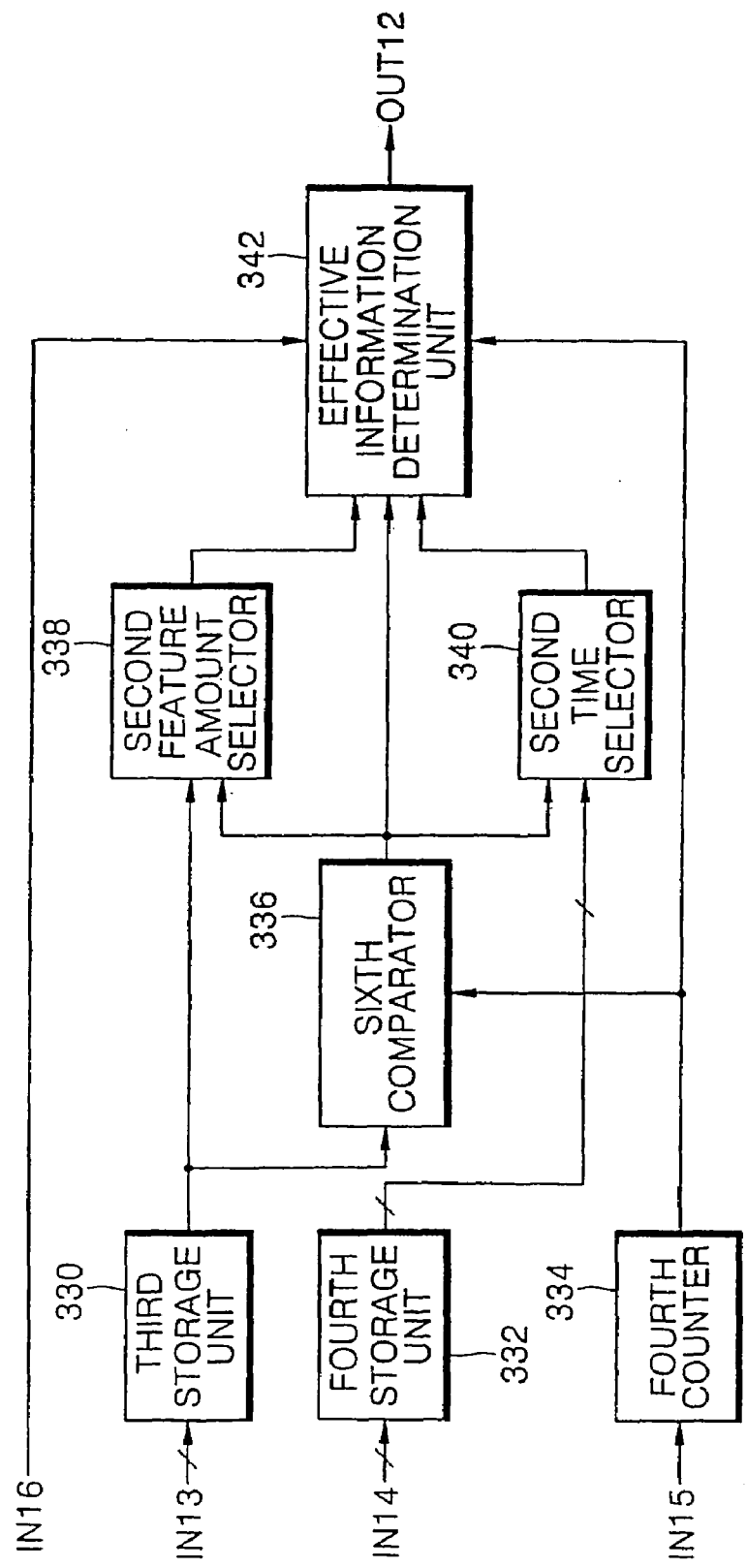
FIG. 19 is a block diagram of an information selection apparatus for performing the method of FIG. 18 according to the present invention.

FIG. 19 is a block diagram of an information selection apparatus for performing the method of FIG. 18 according to the present invention. The information selection apparatus includes a third storage unit 330, a fourth storage unit 332, a fourth counter 334, a sixth comparator 360, a second feature amount selector 338, a second time selector 340, and an effective information determination unit 342.

The information selection method of FIG. 18 is the same as that of FIG. 16 with the exception that, step 370 in FIG. 18 is performed instead of step 304. In addition, the structure and operations of the information selection apparatus shown in FIG. 19 are the same as those of the information selection apparatus shown in FIG. 17 with the exception that the sixth comparator 360 in FIG. 19 is used instead of the fifth comparator 336. Accordingly, in describing FIGS. 18 and 19, repeated portions will be omitted.

Unlike the method shown in FIG. 16, in the information selection method shown in FIG. 18, if it is determined that there are at least two effective motions, it is determined in step 370 whether the amounts of the effective motions, that is, the degrees of the effective motions, are the same. If it is determined that the amounts of the effective motions are the same, the procedure goes to step 306. If it is determined that the amounts of the effective motions are not the same, the procedure goes to step 308. For this, the sixth comparator 360 of FIG. 19 compares the feature amounts received from the third storage unit 330 and outputs the result of comparison to the second feature amount selector 338, the second time selector 340, and the effective information determination unit 342. Accordingly, if it is determined that the feature amounts corresponding to the effective motions are the same based on the result of comparison performed by the sixth comparator 360, that is, if it is determined that the degrees of the effective motions are the same, the second time selector 340 performs step 306. In contrast, if it is determined that the feature amounts corresponding to the effective motions are not the same based on the result of comparison performed by the sixth comparator 360, the second feature amount selector 338 performs step 308.

According to the present invention, the effective information determination unit 246, 286, or 342 shown in FIG. 13, 15, 17, or 19 may recognize which motion unit 40 among one or more motion units 40 generates the effective motion selected in step 224, 264, 306, or 308. For this, instead of outputting the selected feature amount, the first or second feature amount selector 244 or 338 outputs a unique identification number for identifying the motion unit 40, which generates a motion corresponding to the selected feature amount, to the effective information determination unit 246 or 342. Instead of outputting the selected time, the first or second time selector 284 or 340 outputs the unique identification number of the motion unit 40, which generates a motion corresponding to the feature amount generated at the selected time, to the effective information determination unit 286 or 342. Accordingly, the effective information determination unit 246 can recognize which motion unit 40 has generated a motion selected as an effective motion based on the unique identification number received from the first feature amount selector 244. Similarly, the effective information determination unit 286 can recognize which motion unit 40 has generated a motion selected as an effective motion based on the unique identification number received from the first time selector 284. The effective information determination unit 342 can recognize which motion unit 40 has generated a motion selected as an effective motion based on the unique identification number received from the second-feature amount selector 338 or the second time selector 340.

The information selection apparatus shown in FIG. 2 may be provided with a separate communication unit (not shown) for converting the format of an effective signal received from the effective signal detection unit 48, converting the signal having the converted format into a wireless signal, and wirelessly transmitting the wireless signal to the effective information determination unit 54.

As described above, the motion unit 40 can be attached to a user's predetermined body part. In the case where the predetermined body part is a finger, the sensing unit 42 senses the motion of a finger joint. In the case where the predetermined body part is a hand, the sensing unit 42 senses the motion of the wrist. In the case where the predetermined body part is a neck, the sensing unit 42 senses the motion of the neck joint. In addition, in the case where the sensing unit 42 senses the motion of a third joint from the end of the finger, an information selection method and apparatus according to the present invention can be used for recognizing whether the clicking motion of a finger such as an index finger, middle finger, ring finger, or little finger is effective, because the third joint of a finger is usually moved when a user clicks a key on a widely known QWERY keyboard.

For example, let us assume that a user inputs information in a three-dimensional space by moving a glove-shaped member endowed with the sensing unit 42, and the sensing unit 42 is composed of inertial sensors attached to fingers and the back of a hand. Here, an information selection method according to the present invention can be used for recognizing whether the information pointed at by the motion angle of a finger at its joint is effective or for recognizing whether a finger's clicking motion for determining the input of information pointed at by the finger is effective.

Consequently, when a user intends to point or input information by moving the motion unit 40 in a two- or three-dimensional space, an information selection method and apparatus according to the present invention can recognize whether the motion of the motion unit 40 is effective in apparatuses for sensing the motion of the motion unit 40.

INDUSTRIAL APPLICATION

As described above, considering that a change in the size of the motion sensing result of the motion unit 40 can be large or small when information is selected by slowly or quickly moving the motion unit 40, a method and apparatus for selecting information in a multi-dimensional space according to the present invention detect, as a portion having a change in size, the difference between the results of filtering performed using the first and second filters 140 and 142 having is different cut-off frequencies, thereby overcoming difficulty in setting a predetermined threshold to a single value. In addition, even the very slight motion of the motion unit 40 can be accurately detected without being influenced by gravity and offsets which can be provoked by using an inertial sensor as the sensing unit 42. Moreover, the present invention can accurately determine whether a user's two- or three-dimensional motion is an effective motion for selecting information and which motion unit 40, among at least two motion units 40, has generated the effective motion, thereby achieving a high correct recognition rate and high reliability and allowing a user to easily select the desired information.

What is claimed is:

1. A method of selecting information in a multi-dimensional space, the method comprising the steps of:
   (a) sensing the motion of a user for information selection;
   (b) determining, using the amount of the sensed motion, whether the sensed motion is an effective motion of the intended information selection and returning to step (a) if it is determined that the motion is not the effective motion;
   (c) determining whether the amount of the sensed motion exceeds a predetermined amount after step (a) and going to step (b) if it is determined that the amount of the motion does not exceed the predetermined amount;
   (d) if it is determined that the motion is the effective motion in step (b), determining the information selected by the effective motion as effective information;
   wherein step (b) comprises the sub-steps of:
   (b1) extracting as a feature amount a portion having a change in the size of the sensing result;
   (b2) determining whether the feature amount is at least of a predetermined threshold and turning to step (a) if it is determined that the feature amount is less than the predetermined threshold; and
   (b3) if it is determined that the feature amount is at least of the predetermined threshold, determining that the motion is the effective motion and going to step (d).

2. The method of claim 1, wherein step (b1) comprises band-pass filtering the result of sensing and determining the result of band-pass filtering as the feature amount.

3. The method of claim 1, wherein step (b1) comprises the sub-steps of:
   (b11) filtering a first frequency component and a second frequency component of the result of sensing; and
   (b12) obtaining a difference between the first and second filtered frequency components and determining the difference as the feature amount.

4. The method of claim 3, wherein the first and second frequency components are low-band components.

5. The method of claim 3, wherein the first frequency component is a low-band component, and the second frequency component is a high-band component.

6. The method of claim 3, wherein the first frequency component is a low-band component, and the second frequency component is a band component.

7. The method of claim 3, wherein the first frequency component is a high-band component, and the second frequency component is a band component.

8. The method of claim 3, wherein the first and second frequency components are high-band components.

9. The method of claim 3, wherein the first and second frequency components are band components.

10. The method of claim 1, wherein in step (b1), a positive component of the portion having a change in the size of the sensing result is extracted as the feature amount.

11. The method of claim 1, wherein in step (b1), a negative component of the portion having a change in the size of the sensing result is extracted as the feature amount.

12. The method of claim 1, wherein step (b) further comprises the sub-step of (b4) determining whether the feature amount is maintained to be at least of the predetermined threshold for a first predetermined period if it is determined that the feature amount is at least the predetermined threshold, and turning to step (a) if it is determined that the feature amount is not maintained to be at least of the predetermined threshold for the first predetermined period, and in step (b3), the motion is determined as the effective motion if it is determined that the feature amount is maintained to be at least of the predetermined threshold for the first predetermined period.

13. The method of claim 12, wherein when whether the motion is the effective motion is determined in step (b), the result of sensing obtained during a period other than the first predetermined period in a second predetermined period is not used, and the second predetermined period is longer than the first predetermined period.

14. The method of claim 1, farther comprising the step of regularizing the result of sensing after step (a) and going to step (b), wherein in step (b) whether the motion is the effective motion is determined from the result of regularization.

15. The method of claim 1, wherein step (b) farther comprises regularizing the portion having a change in size extracted in step (b1), determining the result of regularization as the feature amount, and going to step (b2).

16. The method of claim 14, wherein the result of regularization is the result of multiplying the result of sensing by a weight which corresponds to a motion degree at which the user can move when selecting the information.

17. The method of claim 15, wherein the result of regularization is the result of multiplying the portion having a change in size by a weight which corresponds to a motion degree at which the user can move when selecting the information.

18. The method of claim 14, further comprising the steps of:
(e1) determining whether there are at least two effective motions; and
(e2) if it is determined that there are at least two effective motions, selecting a largest effective motion from the at least two effective motions and going to step (d),
wherein in step (d), if it is determined that there is only one effective motion in step (e1), information, which is selected by the single effective motion is determined as the effective information, or information, which is selected from information selected by the effective motions by the effective motion selected in step (e2), is determined as the effective information.

19. The method of claim 14, further comprising the steps of:
(f1) determining whether there are at least two effective motions; and
(f2) if it is determined that there are at least two effective motions, selecting a first determined effective motion from the at least two effective motions and going to step (d),
wherein in step (d), if it is determined that there is only one effective motion in step (f1), information selected by the single effective motion is determined as the effective information, or information selected by the effective motion selected from the at least two effective motions in step (f2) is determined as the effective information.

20. The method of claim 14, further comprising the steps of:
(g1) determining whether there are at least two effective motions; and (g2) if it is determined that there are at least two effective motions, determining whether the effective motions are simultaneously determined;
(g3) if it is determined that the effective motions are simultaneously determined, selecting a largest effective motion from the at least two effective motions and going to step (d); and
(g4) if it is determined that the effective motions are not simultaneously determined, selecting a first determined effective motion from the at least two effective motions and going to step (d),
wherein in step (d), if it is determined that there is only one effective motion in step (g1), information, which is selected by the single effective motion is determined as the effective information, or information, which is selected from information selected by the at least two effective motions by the effective motion selected in step (g3) or (g4), is determined as the effective information.

21. The method of claim 14, further comprising the steps of:
(h1) determining whether there are at least two effective motions; and
(h2) if it is determined that there are at least two effective motions, determining whether the amounts of the effective motions are the same;
(h3) if it is determined that the effective motions are not the same, selecting a largest effective motion from the at least two effective motions and going to step (d); and
(h4) if it is determined that the effective motions are the same, selecting a first determined effective motion from the at least two effective motions and going to step (d),
wherein in step (d), if it is determined that there is only one effective motion in step (h1), information, which is selected by the single effective motion is determined as the effective information, or information, which is selected from information selected by the at least two effective motions by the effective motion selected in step (h3) or (h4), is determined as the effective information.

22. The method of claim 16, wherein the user moves a predetermined body pad when selecting the information.

23. The method of claim 22, wherein the predetermined body part is at least one hand.

24. The method of claim 23, wherein the weight varies with the kind of finger.

25. The method of claim 23, wherein the weight varies with an angle at which a finger is bent.

26. The method of claim 23, wherein the motion corresponds to a third joint of a finger.

27. The method of claim 22, wherein step (c) comprises determining whether the amount of the sensed upward, downward, leftward, rightward, frontward, or backward motion of the predetermined body part exceeds the predetermined amount after step (a) and going to step (b) if it is determined that the amount of the sensed motion does not exceed the predetermined amount.

28. The method of claim 22, wherein the predetermined threshold is set according to a motion degree at which the predetermined body part can be moved.

29. The method of claim 13, wherein when the information is selected, the user moves a predetermined body part, and the second predetermined period is set depending on the kind of predetermined body part.

30. An apparatus for selecting information in a multi-dimensional space, the apparatus comprising:

at least one motion unit moved by a user intending to select information;

at least one sensing unit for sensing the motion of the motion unit and outputting the result of sensing;

at least one effective signal detection unit for checking whether the motion of the motion unit is an effective motion intending to select the information based on the result of sensing and outputting the result of checking as an effective signal;

a motion amount detection unit for detecting the amount of the motion from the result of sensing;

a first comparator for comparing the amount of the motion received from the motion amount detection unit with a predetermined amount and outputting the result of comparison, wherein the effective signal detection unit checks whether the motion of the motion unit is the effective motion in response to the result of comparison performed the first comparator;

an effective information determination unit for determining information selected by the motion as effective information in response to the effective signal received from the effective signal detection unit:

wherein the effective signal detection unit comprises:

a feature amount detector for extracting as a feature amount a portion having a change in the size of the sensing result input from the sensing unit and outputting the extracted feature amount;

a second comparator for comparing the feature amount received from the feature amount detector with a predetermined threshold and outputting the result of comparison; and an effective signal generator for generating the effective signal in response to the result of comparison received from the second comparator, and wherein the sensing unit senses the motion of the motion unit in response to the result of comparison received from the second comparator.

31. The apparatus of claim 30, wherein the feature amount detector comprises a band-pass filter for band-pass filtering the result of sensing and outputting the result of band-pass filtering as the feature amount.

32. The apparatus of claim 31, wherein the feature amount detector comprises:

a first filter for filtering a first frequency component of the result of sensing and outputting the result of filtering;

a second filter for filtering a second frequency component of the result of sensing and outputting the result of filtering; and a differential calculator for calculating a difference between the result of filtering received from the first filter and the result of filtering received from the second filter and outputting the difference as the feature amount.

33. The apparatus of claim 32, wherein the first and second frequency components are low-band components.

34. The apparatus of claim 32, wherein the first frequency component is a low-band component, and the second frequency component is a high-band component.

35. The apparatus of claim 32, wherein the first frequency component is a low-band component, and the second frequency component is a band component.

36. The apparatus of claim 32, wherein the first frequency component is a high-band component, and the second frequency component is a band component.

37. The apparatus of claim 32, wherein the first and second frequency components are high-band components.

38. The apparatus of claim 32, wherein the first and second frequency components are band components.

39. The apparatus of claim 32, wherein the feature amount detector further comprises a signal extractor for extracting only a positive component of the difference received from the differential calculator and outputting the extracted positive component as the feature amount.

40. The apparatus of claim 39, wherein the signal extractor comprises a first rectifier for rectifying the difference received from the differential calculator and outputting the result of rectification as the feature amount.

41. The apparatus of claim 32, wherein the feature amount detector further comprises a signal extractor for extracting only a negative component of the difference received from the differential calculator and outputting the extracted negative component as the feature amount.

42. The apparatus of claim 41, wherein the signal extractor comprises:

a first inverter for inverting the difference received form the differential calculator and outputting the result of inversion:

a second rectifier for rectifying the result of inversion received from the first inverter and outputting the result of rectification; and a second inverter for inverting the result of rectification received from the second rectifier and outputting the result of inversion as the feature amount.

43. The apparatus of claim 30, wherein the effective signal detection unit further comprises:

a first counter for performing a counting operation in response to the result of comparison received from the second comparator; and a third comparator for comparing the result of counting received from the first counter with a first predetermined period and outputting the result of comparison, the effective signal generator generates the effective signal in response to the result of comparison received from the third comparator, and the sensing unit senses the motion in response to the result of comparison received from the third comparator.

44. The apparatus of claim 43, wherein the effective signal detection unit further comprises a fourth comparator for comparing the result of counting received from the first counter with a second predetermined period and outputting the result of comparison, the second predetermined period being longer than the first predetermined period.

45. The apparatus of claim 44, wherein the effective signal generator generates the effective signal in response to the result of comparison received from the fourth comparator.

46. The apparatus of claim 44, wherein the sensing unit senses the motion in response to the result of comparison received from the fourth comparator.

47. The apparatus of claim 30, further comprising a regularizing unit for regularizing the result of sensing received from the sensing unit and outputting the result of regularization to the effective signal detection unit, wherein the effective signal detection unit generates the effective signal based on the result of regularization received from the regularizing unit.

48. The apparatus of claim 47, wherein the regularizing unit comprises a multiplier for multiplying the result of sensing by a weight and outputting the result of multiplication as the result of regularization, the weight being set depending on a motion degree at which the motion unit can be moved.

49. The apparatus of claim 30, wherein the effective signal detection unit further comprises a regularizing unit for regularizing the portion having a change in the size, which is extracted by the feature amount detector, and outputting the result of regularization as the feature amount to the second comparator.

50. The apparatus of claim 49, wherein the regularizing unit comprises a multiplier for multiplying the portion having a change in the size, which is extracted by the feature amount detector, by a weight and outputting the result of multiplication as the result of regularization to the second comparator, the weight being set depending on a motion degree at which the motion unit can be moved.

51. The apparatus of claim 47, further comprising:
a first storage unit for receiving one or more feature amounts corresponding to the one or more effective motions from the feature amount detector and storing the one or more feature amounts;
a second counter for counting the number of one or mote effective signal generated from the effective signal detection unit; and
a first feature amount selector for selecting a biggest feature amount from among the one or more feature amounts stored in the first storage unit in response to the result of counting received from the second counter,
wherein in response to the result of counting received from the second counter, the effective information determination unit determines information, which is selected by the sole effective motion, or information, which is selected from a plurality of pieces of information selected by the two or more effective motions by an effective motion corresponding to the selected feature amount, as the effective information.

52. The apparatus of claim 47, further comprising:
a second storage unit for storing one or more instants of time when one or more feature amounts corresponding to the one or more effective motions are generated from the feature amount detector;
a third counter for counting the number of one or more effective signals generated from the effective signal detection unit; and
a first time selector for selecting an earliest time from among the one or more times stored in the second storage unit in response to the result of counting received from the third counter and outputting the selected time,
wherein in response to the result of counting received from the third counter, the effective information determination unit determines information, which is selected by the sole effective motion, or information, which is selected from a plurality of pieces of information selected by the two or more effective motions by an effective motion corresponding to the selected feature amount generated at the selected instant of time, as the effective information.

53. The apparatus of claim 47, further comprising:
a third storage unit for receiving one or more feature amounts corresponding to the one or more effective motions from the effective signal detection unit and storing the one or more feature amounts;
a fourth storage unit for storing of one or more instants of time when one ore more feature amounts corresponding to the one or more effective motions are generated from the effective signal detection unit;
a fourth counter for counting the number of the one or more effective signals generated from the effective signal detection unit;
a fifth comparator for comparing the one or more times stored in the fourth storage unit and outputting the result of comparison;
a second feature amount selector for selecting a largest feature amount from the one or more feature amounts stored in the third storage unit in response to the result of comparison received from the fifth comparator; and
a second time selector for selecting an earliest instant of time from the one or more instants of time stored in the fourth storage unit in response to the result of comparison received from the fifth comparator and outputting the selected time,
wherein the effective information determination unit determines information, which is selected by the sole effective motion, as the effective information in response to the result of counting received from the fourth counter or determines information, which is selected by an effective motion corresponding to the feature amount selected by the second feature amount selector or to the instant of time selected by the second time selector, as the effective information in response to the result of comparison received from the fifth comparator, among a plurality of pieces of information selected by the two or more effective motions.

54. The apparatus of claim 47, further comprising:
a third storage unit for receiving one or more feature amounts corresponding to the one or more effective motions from the effective signal detection unit and storing the one or more feature amounts;
a fourth storage unit for storing one or more instants of time when one or more feature amounts corresponding to the one or more effective motions are generated from the effective signal detection unit;
a fourth counter for counting the number of the one or more effective signals generated from the effective signal detection unit;
a fifth comparator for comparing the one or more feature amounts stored in the third storage unit and outputting the result of comparison;
a second feature amount selector for selecting a biggest feature amount from the one or more feature amounts store in the third storage unit in response to the result of comparison received from the fifth comparator; and
a second time selector for selecting an earliest instant of time from the one or more instants of time stored in the fourth storage unit in response to the result of comparison received from the fifth comparator and outputting the selected time,
wherein the effective information determination unit determines information, which is selected by the sole effective motion, as the effective information in response to the result of counting received from the fourth counter or determines information, which is selected by an effective motion corresponding to the feature amount selected by the second feature amount selector or to the time selected by the second time selector, as the effective information in response to the result of comparison received from the fifth comparator, among a plurality of pieces of information selected by the two or more effective motions.

* * * * *